(12) United States Patent
Price

(10) Patent No.: US 10,810,678 B2
(45) Date of Patent: Oct. 20, 2020

(54) SYSTEM AND METHOD FOR AUTOMATED RISK MANAGEMENT APPRAISAL

(71) Applicant: Michael Price, Menlo Park, CA (US)

(72) Inventor: Michael Price, Menlo Park, CA (US)

( * ) Notice: Subject to any disclaimer, the term of this patent is extended or adjusted under 35 U.S.C. 154(b) by 99 days.

(21) Appl. No.: 15/999,265

(22) Filed: Aug. 17, 2018

(65) Prior Publication Data

US 2019/0005584 A1    Jan. 3, 2019

Related U.S. Application Data

(63) Continuation of application No. 12/612,558, filed on Nov. 4, 2009, now Pat. No. 10,055,792.

(51) Int. Cl.
*G06Q 40/00* (2012.01)
*G06Q 40/08* (2012.01)

(52) U.S. Cl.
CPC ............. *G06Q 40/08* (2013.01); *G06Q 40/00* (2013.01)

(58) Field of Classification Search
CPC ...................................................... G06Q 40/00
See application file for complete search history.

(56) References Cited

U.S. PATENT DOCUMENTS

| | | | |
|---|---|---|---|
| 4,766,539 A | 8/1988 | Fox | |
| 4,975,840 A | 12/1990 | DeTore et al. | |
| 5,797,134 A | 8/1998 | McMillan et al. | |
| 5,873,066 A | 2/1999 | Underwood et al. | |
| 5,930,760 A | 7/1999 | Anderton et al. | |
| 6,088,678 A | 7/2000 | Shannon | |
| 6,170,742 B1 | 1/2001 | Yacoob | |
| 6,182,048 B1 | 1/2001 | Osborn et al. | |
| 6,185,540 B1 | 2/2001 | Schreitmueller et al. | |
| 6,327,363 B1 | 12/2001 | Henderson et al. | |
| 6,519,571 B1 | 2/2003 | Guheen et al. | |
| 6,557,752 B1 | 5/2003 | Yacoob | |
| 6,662,090 B2 | 12/2003 | Toyama et al. | |
| 6,810,406 B2 | 10/2004 | Schlabach et al. | |
| 6,871,181 B2 | 3/2005 | Kansai Namita | |

(Continued)

FOREIGN PATENT DOCUMENTS

| WO | 1997/048040 A1 | 12/1997 |
|---|---|---|
| WO | 2000/052612 A1 | 9/2000 |

(Continued)

OTHER PUBLICATIONS

Ahmad Kreydieh, Risk Management in Bot Project Financing, May 1996, Massachusetts Institute of Technology, web, 6-50 (Year: 1996).*

(Continued)

*Primary Examiner* — I Jung Liu
(74) *Attorney, Agent, or Firm* — Perkins Coie LLP

(57) ABSTRACT

The invention is a system and method of appraising and managing risk relating to technology needs using a risk management processing engine. The risk management processing engine serves as a central server for an administrator to manage a plurality of policy holders and third party service technicians. The invention gathers policy holder data, determining the risk associated with the data, creating a risk management policy for technology service events and technology service situations in order to mitigate or eliminate the risk, and resolving serviceable events when risk is actualized.

32 Claims, 10 Drawing Sheets

(56) References Cited

U.S. PATENT DOCUMENTS

| | | | |
|---|---|---|---|
| 6,922,720 | B2 | 7/2005 | Cianciarulo et al. |
| 7,027,992 | B2 | 4/2006 | Zaccaria et al. |
| 7,107,229 | B1* | 9/2006 | Sullivan .............. G06Q 40/00 705/36 R |
| 7,124,059 | B2 | 10/2006 | Wetzer et al. |
| 7,249,030 | B2 | 7/2007 | Sopko et al. |
| 7,249,040 | B1 | 7/2007 | Binns et al. |
| 7,322,030 | B1 | 1/2008 | Boodro et al. |
| 7,346,524 | B2 | 3/2008 | Goux |
| 7,356,498 | B2 | 4/2008 | Kaminsky et al. |
| 7,373,308 | B2 | 5/2008 | Merkin et al. |
| 7,383,239 | B2 | 6/2008 | Bonissone et al. |
| 7,386,463 | B2 | 6/2008 | McCabe |
| 8,756,696 | B1 | 6/2014 | Miller |
| 10,055,792 | B2 | 8/2018 | Price |
| 2001/0041988 | A1 | 11/2001 | Lin |
| 2001/0051884 | A1 | 12/2001 | Wallis et al. |
| 2002/0002475 | A1 | 1/2002 | Freedman et al. |
| 2002/0116491 | A1 | 8/2002 | Boyd et al. |
| 2003/0074294 | A1 | 4/2003 | Merkin et al. |
| 2003/0172087 | A1 | 9/2003 | Godwin |
| 2003/0172367 | A1 | 9/2003 | Kannenberg |
| 2003/0192328 | A1 | 10/2003 | Kikuchi et al. |
| 2003/0195904 | A1 | 10/2003 | Chestnut et al. |
| 2004/0128313 | A1 | 7/2004 | Whyman |
| 2004/0215566 | A1 | 10/2004 | Meurer |
| 2004/0230459 | A1 | 11/2004 | Dordick et al. |
| 2006/0100912 | A1 | 5/2006 | Kumar et al. |
| 2006/0190304 | A1 | 8/2006 | Kobayashi et al. |
| 2006/0259392 | A1 | 11/2006 | Rabenold et al. |
| 2007/0005399 | A1 | 1/2007 | Weber et al. |
| 2008/0033750 | A1 | 2/2008 | Burriss et al. |
| 2008/0091625 | A1 | 4/2008 | Kremen |
| 2008/0208667 | A1 | 8/2008 | Lymbery et al. |
| 2009/0083586 | A1 | 3/2009 | Warner et al. |
| 2009/0132295 | A1* | 5/2009 | Pecan .............. G06Q 40/08 705/4 |

FOREIGN PATENT DOCUMENTS

| | | |
|---|---|---|
| WO | 2001/016845 A1 | 3/2001 |
| WO | 2001/039082 A2 | 5/2001 |
| WO | 2001/097139 A2 | 12/2001 |
| WO | 2002/001393 A2 | 1/2002 |
| WO | 2002/015082 A1 | 2/2002 |
| WO | 2003/003163 A2 | 1/2003 |
| WO | 2003/021501 A2 | 3/2003 |
| WO | 2004/059420 A2 | 7/2004 |
| WO | 2006/124036 A2 | 11/2006 |
| WO | 2007/007944 A1 | 1/2007 |
| WO | 2007/143020 A2 | 12/2007 |
| WO | 2008/051736 A2 | 5/2008 |

OTHER PUBLICATIONS

Institute of Electrical Engineers, "Service and Maintenance Contracts for Computers", [abstract], Institution of Electrical Engineers Conference Proceedings, Mar. 24-25, 1987, 1 page.

IYogi Online Technical Support—Computer Repair Services and PC Repair, [online] Retrieved from: <http://www.iyogi.net/iyoginet/yhus/?OVRAW=computer%20service%2...0service&OVMTC=advanced&OVADID=16436796021&0VKW1D=91693469521>, Accessed on Aug. 11, 2008, 2007, 2 pages.

Kaufmann, D., "Control Service Operating Expenses Using Equipment Maintenance Insurance", Imaging Economics, [internet], Retrieved from: <http://www.imagingeconomics.com/issues/articles/2007-09_03.asp>, Accessed on Aug. 11, 2008, Sep. 2007, 4 pages.

Kreydieh, Ahmad, "Risk Management in BOT Project Financing", Massachusetts of Technology, May 1996, 72 pages.

Nationwide Mutual Insurance Co., "Equipment Breakdown Insurance—Equipment Failure Doesn't Have to Mean Business Failure", [internet], Retrieved from: <http://www.nationwide.com/business-equipment-insurance-protection.jsp>, Accessed on: Aug. 11, 2008, 1 page.

The Berkeley Group, "Claims Process", [internet], Retrieved from: <http://www.equipmaintaininsurance.com/claims.htm>, Accessed on Aug. 11, 2008, 2 pages.

The Berkeley Group, "How the Program Works", [internet], Retrieved from: <http://www.equipmaintaininsurance.com/promanage.htm>, Accessed on Aug. 11, 2008, 2 pages.

The Berkeley Group, "Program Management", [internet], Retrieved from: <http://www.equipmaintaininsurance.com/promanage.htm>, Accessed on Aug. 11, 2008, 2 pages.

* cited by examiner

SYSTEM AND METHOD FOR AUTOMATED RISK MANAGEMENT APPRAISAL

CROSS REFERENCE TO RELATED APPLICATION

This Application is a Continuation of U.S. application Ser. No. 12/612,558, filed 4 Nov. 2009, now U.S. Pat. No. 10,055,792, issued Aug. 21, 2018, which is incorporated herein in its entirety by this reference thereto.

TECHNICAL FIELD

The invention relates to providing risk management services for technology needs. More particularly, the invention relates to managing technology needs with a risk management policy that is established for individual policy holders, as well as by automatically monitoring risk, adaptively re-calculating risk, and determining a premium for the risk management policy.

DESCRIPTION OF THE RELATED ART

There is a trend toward greater reliance upon technology. Also, consumers demand that such technology be both functional and available. Furthermore, there are greater combinations, permutations, and interrelationships of technology. These interrelationships include both technology-technology interrelationships as well as human-technology interrelationships.

The increase in interrelationships creates a greater statistical probability of technology unavailability, as well as technology functional failure. Put simply, use of, and reliance upon, technology has increased while the risk of unavailability, misuse, and failure of such technology has grown.

Unavailability of technology oftentimes forces a business or organization to either replace or repair the technology immediately. Replacement and repair costs are oftentimes themselves considerable. However, there are additional and significant costs associated with downtime and loss of productivity that go along with unavailability of technology. Moreover, the failure of a single technology can have compounding effects due to technology-technology interrelationships.

Although technology support and servicing can be a very significant cost to an organization, many organizations take a reactive approach to technology unavailability rather than proactively planning for unexpected technology unavailability.

Previous approaches attempting to provide proactive planning for technology failure are old-fashioned and do not address modern technology systems. For example, some cell phone users carry insurance on their handset. However, typical cell phone insurance only covers replacement of the handset in the event of destruction, loss, or other irreparable damage to the hardware. Accordingly, the cell phone user is without recourse if the software on the handset renders one or more other functions inoperable.

Likewise, the technology service industry itself is outdated and does not provide solutions needed to address modern technological problems. Common technology service approaches include fee for service on a time and material basis, service on a flat fee basis, warranty service, extended warranty service, and bundled services. However, these approaches are far from comprehensive. For example, a typical technology service plan does not cover costs associated with removal of outdated technology or training employees to use a new product.

Accordingly, there is a need for risk management policies that provide a policy holder with an interactive interface, automatically monitor risk, adaptively re-calculate risk, determine a premium, and resolve technology needs.

SUMMARY OF THE INVENTION

The invention is directed toward a system and method of managing risk relating to technology needs. In some embodiments of the invention, an individual, business, organization, or government entity purchases a risk management policy from a policy administrator, wherein the policy covers expected and unexpected technology needs. In the event of an expected or unexpected event, either the policy administrator resolves the problem, or the policy holder resolves the problem himself, submits a claim to a policy administrator, and requests that the administrator reconcile the claim.

In some embodiments of the invention, a risk management processing engine serves as a central server for an administrator to manage a plurality of policy holder technical systems. In some embodiments, the risk management processing engine includes a plurality of processing modules including: an administrative module, a policy holder account module, a risk determination module, an automated data collection module, a premium calculation module, a service deployment module, and auxiliary modules.

In some embodiments of the invention, the policy administrator resolves technical needs in exchange for a premium. The premium is calculated based on the risk associated with the policy holders' particular technical system environments. In some embodiments of the invention, the policy is modifiable. In some embodiments, the policy is automatically modifiable and the policy premium can be adaptively re-calculated based on updates or omissions to the policy holders' technical systems.

In some embodiments of the invention, the policy holder individually selects set of terms and conditions to create a personalized technology risk management policy. In some embodiments, a graphical user interface is used to present the policy holder with policy options. In some embodiments, a policy wizard is employed to walk a policy holder through the different coverage options.

In some embodiments of the invention, a method is directed towards determining a premium for a technology risk management policy. In some embodiments, the method includes determining a policy holder's needs, monitoring their technical service usage, establishing a level of risk, determining the administrator's target profit, and calculating a premium. In some embodiments of the invention, the policy holders' technical systems are remotely monitored on a continuous or semi-continuous basis. According to these embodiments, the policy premium is automatically adjusted based on the remote monitoring.

DETAILED DESCRIPTION OF THE INVENTION

The invention comprises a risk management system that collects data from a plurality of sources, performs one or more risk determination sequences, reports risk analysis data to a system administrator, and deploys risk management fixes to remedy actualized risk. According to some embodiments of the invention, data is collected manually through human interaction. In some other embodiments, data is collected by policy holders' self-reporting via a user interface. In some other embodiments of the invention, policy holders' technical systems are interconnected in a computer network and data collection is automated using a data collection module.

Figure 1A:
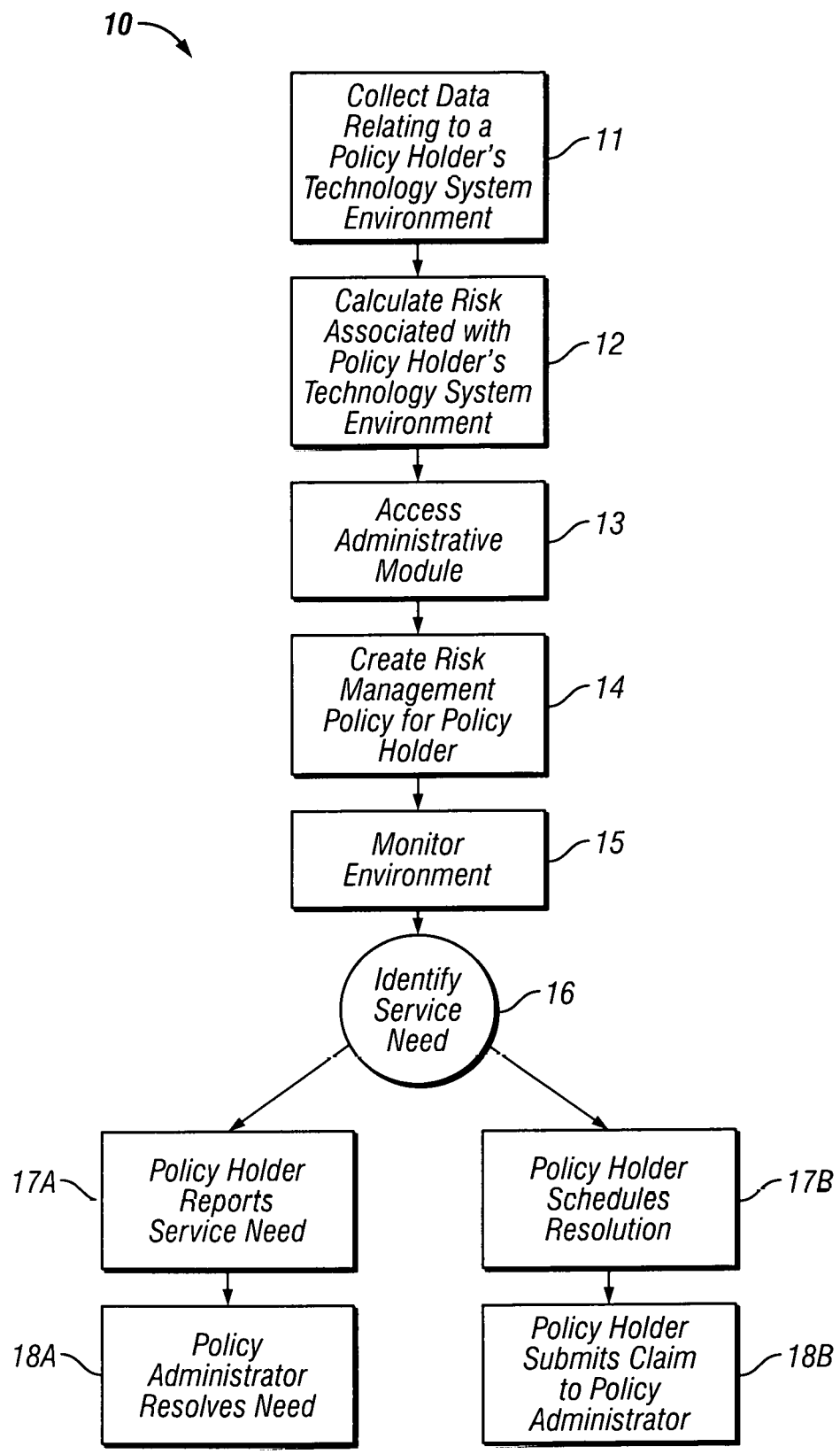
FIG. 1A illustrates a basic workflow performed by the risk management system according to some embodiments of the invention.

The risk management system surveys the environment of a policy holder's technical system, performs a risk management determination, and services the needs of policy holders upon expected and unexpected service events. FIG. 1A illustrates a basic workflow 10 performed by the risk management system according to some embodiments of the invention. The workflow 10 begins by collecting data relating to a policy holder's technical system environment 11. Next, the system calculates a risk associated with the policy holder's technical system environment 12 based on the data obtained. In some embodiments, the risk management system accesses an administrative module to verify the policy holder's account 13.

The system then creates a risk management policy for the policy holder's technical system environment 14 using the calculated risk. After the policy is created, the system monitors the policy holder's technical system environment 15. Next, an expected or unexpected event actually occurs in the policy holder's technical system environment, thereby identifying a technical service need. Depending on the terms and conditions agreed upon between the policy holder and the administrator, one or more scenarios take place to resolve the event.

In some embodiments, once a service need is identified 16, the policy holder reports the service need to a policy administrator 17A. The policy administrator resolves the technical service event 18A, either remotely using bots, remotely using a service technician, locally by using a service technician, or locally using a locally-installed bot.

In some other embodiments, once a service need is identified 16, the policy holder schedules resolution of the event themselves 17B. In this case, the event is resolved and the policy holder submits a claim to the policy administrator 18B and the administrator reconciles the claim.

Most of the remaining portion of this disclosure relates to technology services risk management policies for businesses. In some other embodiments of the invention, the same methodology and infrastructure can be used to create a risk management policy for a wide variety of other endeavors. It will be readily apparent to those with ordinary skill in the art that a wide variety of individuals, organizations, government entities, or non-profit organizations can benefit from the risk management system disclosed herein. Additionally, those with skill in the art will recognize that the risk management system disclosed herein does not only apply to computer system needs, but can also include servicing expected and unexpected events relating to cell phone service, phone service, television service, digital video recorder service, home theater service, home stereo service, elevator service, escalator service, printing toner replacement, among others.

Figure 1B:
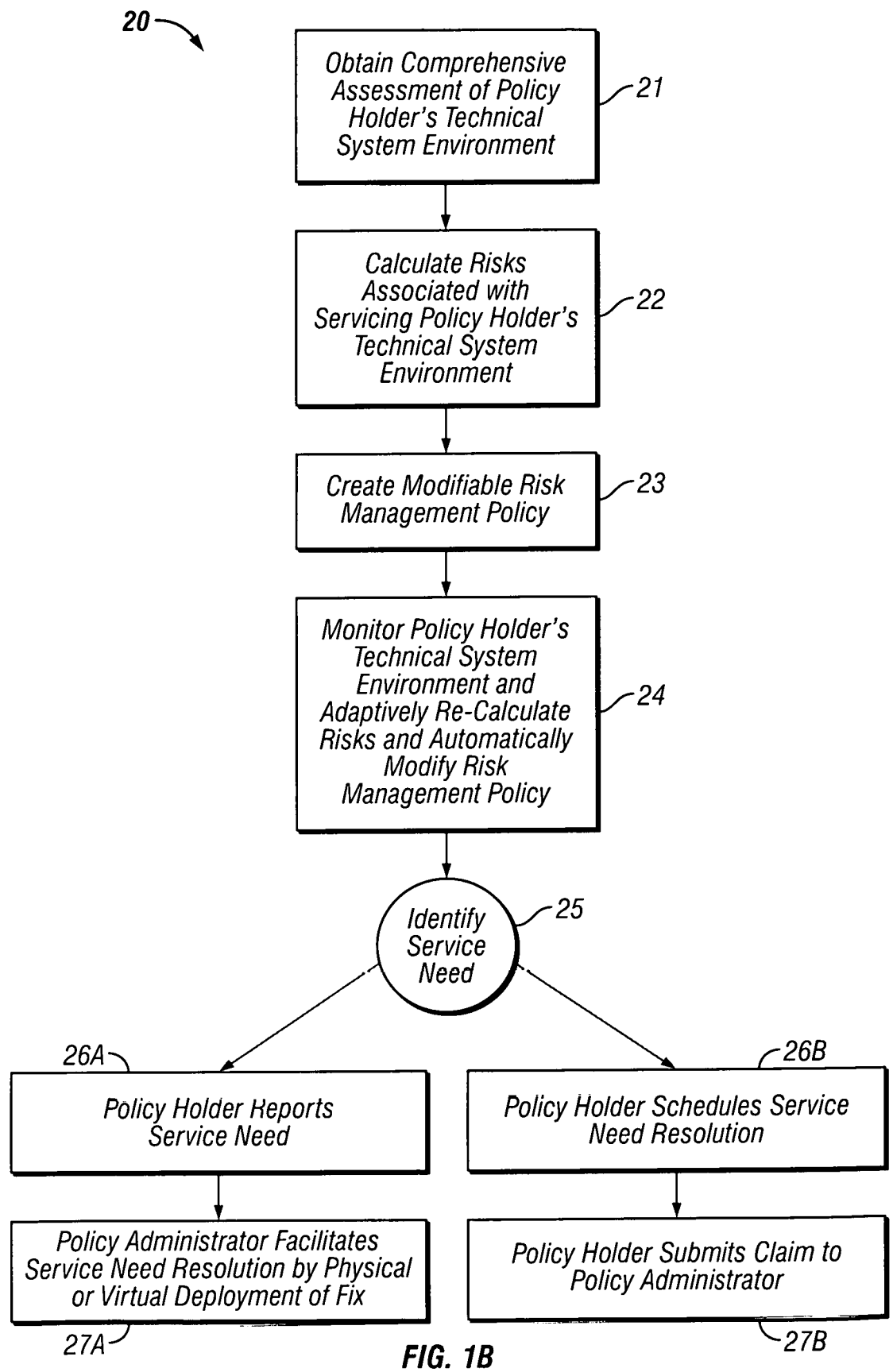
FIG. 1B illustrates a specific embodiment of a workflow for providing a risk management system to a policy holder and adaptively recalculating a policy premium according to some embodiments of the invention.

FIG. 1B illustrates a workflow 20 for providing a risk management system to a policy holder and adaptively recalculating a policy premium according to some embodiments of the invention. First, the system obtains comprehensive assessment of the policy holder's technology environment and needs 21. The system calculates risks involved with the costs associated with servicing policy holder's technology system environment needs 22. Next, the system creates one or more modifiable risk management policies 23. After the system creates a policy, the system monitors the policy holder and adaptively re-calculates risks and automatically modifies the risk management policy 24. In the some embodiments of the invention, the system monitors the policy holder's technical system environment using one or more bots pre-installed on the policy holder's system.

Next, a policy holder experiences an expected or unexpected problem that causes a need for technology service, thereby identifying a service need 25.

In some embodiments, once a service need is identified 25, the policy holder reports the service need to a policy administrator 26A. The policy administrator resolves the technical service event 27A, remotely using bots, remotely using a service technician, locally by using a service technician, or locally using a locally-installed bot.

In some other embodiments, once a service need is identified 25, the policy holder schedules resolution of the event themselves 26B. In this case, the event is resolved and the policy holder submits a claim to the policy administrator 27B and the administrator reconciles the claim.

In yet other embodiments, a policy administrator may identify a need, and a policy holder may decline service. For example, a policy administrator's engine may notice that a policy holder's manufacturer warranty on a server is about to run out, i.e. an OEM service warranty. The policy administrator has an incentive to report this to the policy holder because re-terming the warranty will reduce the risk exposure for the policy administrator because if the computer breaks outside of a warranty contract, the manufacturer will not pay for the replacement parts and possibly labor, increasing the claims exposure for the administrator who may have to pay for the service. However the policy holder may decline to re-term the warranty contract to save money. Further, the policy holder's decision to do nothing to address the identified need may increase a risk factor(s) in the premium/risk calculation engine. As another example, a policy administrator may recommend that all technology functional units use the same operating system version. The policy holder may decline to have this recommendation implemented. This decline saves money in the short term for the policy holder and increases the risk for the policy administrator.

Figure 2A:
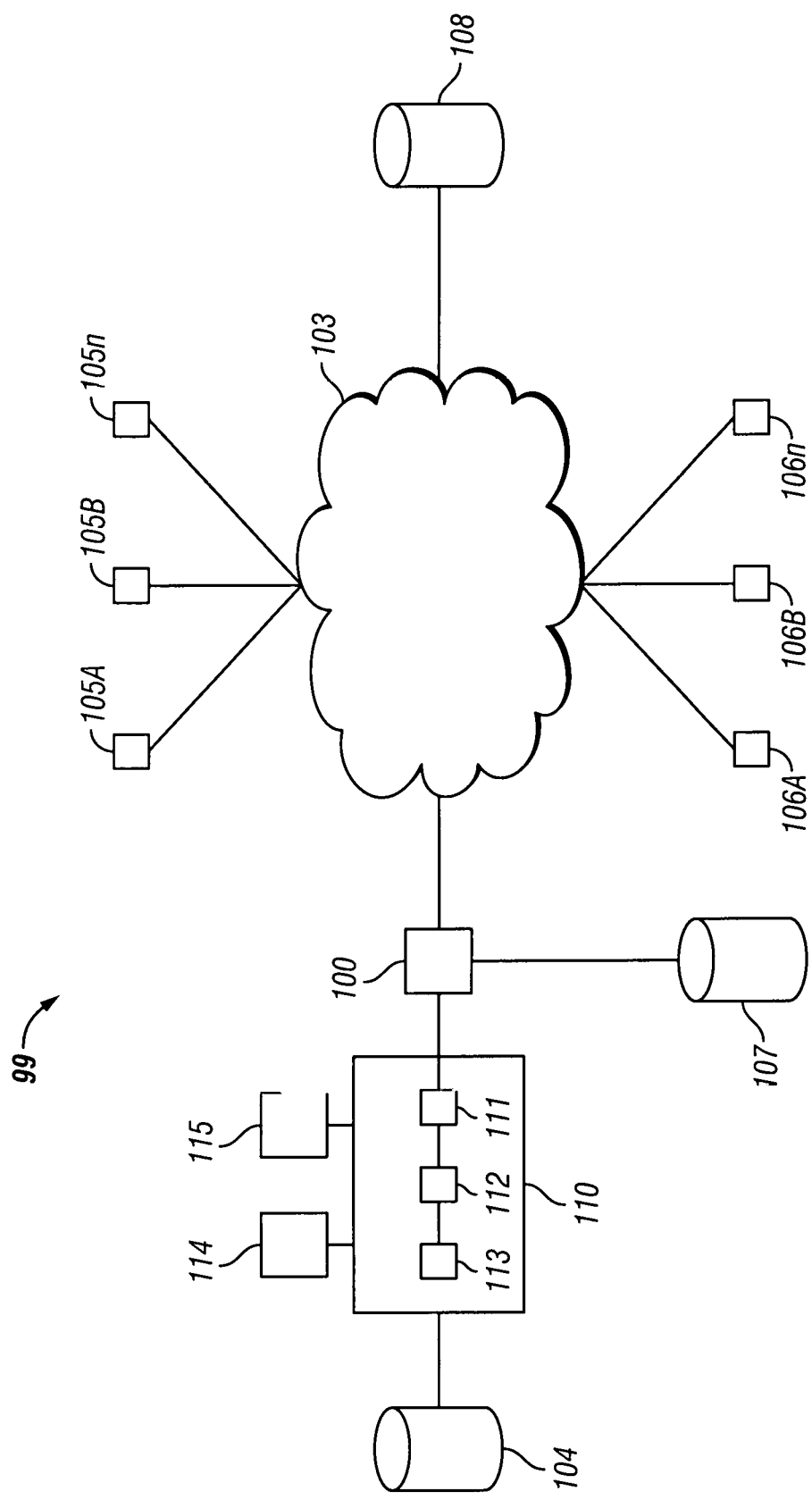
FIG. 2A illustrates a schematic representation of a risk management system comprising a server-based risk management processing engine according to some embodiments of the invention.

FIG. 2A illustrates a risk management system 99 according to some embodiments of the invention. The risk management system 99 comprises a server-based risk management processing engine 110 connected to a network 103 via a server 100. The risk management processing engine 110 comprises a processor 112 coupled with memory 113. In some embodiments of the invention, the risk management processing engine 110 is optionally coupled with an interface 114 and an input device 115. In some embodiments, the interface 114 comprises a computer display with a graphical user interface and the input device comprises a keyboard. The processor 112 is also coupled with a network interface 111 for coupling the risk management processing engine 110 with at least one server 100.

In the presently preferred embodiments of the invention, the risk management processing engine 110 is coupled with a network 103 of computers, such as the Internet. The network 103 connects the risk management processing engine 110 with a plurality of policy holders' technical system environments 105a, 105b, and 105n. Likewise, the network 103 connects the risk management processing engine 110 with a plurality of service provider terminals 106a, 106b, and 106n. Additionally, in some embodiments of the invention, one or more external databases 104, 107, 108 are coupled to the risk management processing engine 110, the server 100, and the network 103. In some embodiments of the invention, the external database 107 stores historical data about risk associated with types of risk management policies.

In the presently preferred embodiment of the invention, the plurality of policy holders' technical system environments 105a, 105b, and 105n include policy-holder-operated software and hardware systems, computer operated software and hardware systems, or both. Also in the presently preferred embodiments, the risk management processing engine 110 is controlled by a technical service risk management administrator. According to these embodiments, the administrator and the policy holder negotiate a contract involving the policy holder paying a premium in exchange for the administrator agreeing to service the policy holder's technical service needs as they arise or reconcile a policy claim for some or all of claims when a policy holder resolves the needs themselves.

In some embodiments, the plurality of service provider terminals 106a, 106b, and 106n belong to third-party technical service providers. According to these embodiments, the technical service risk management administrator notifies one or more third-party technical service providers via one or more communication media to schedule a service call for a policy holder who has reported a problem.

Figure 2B:
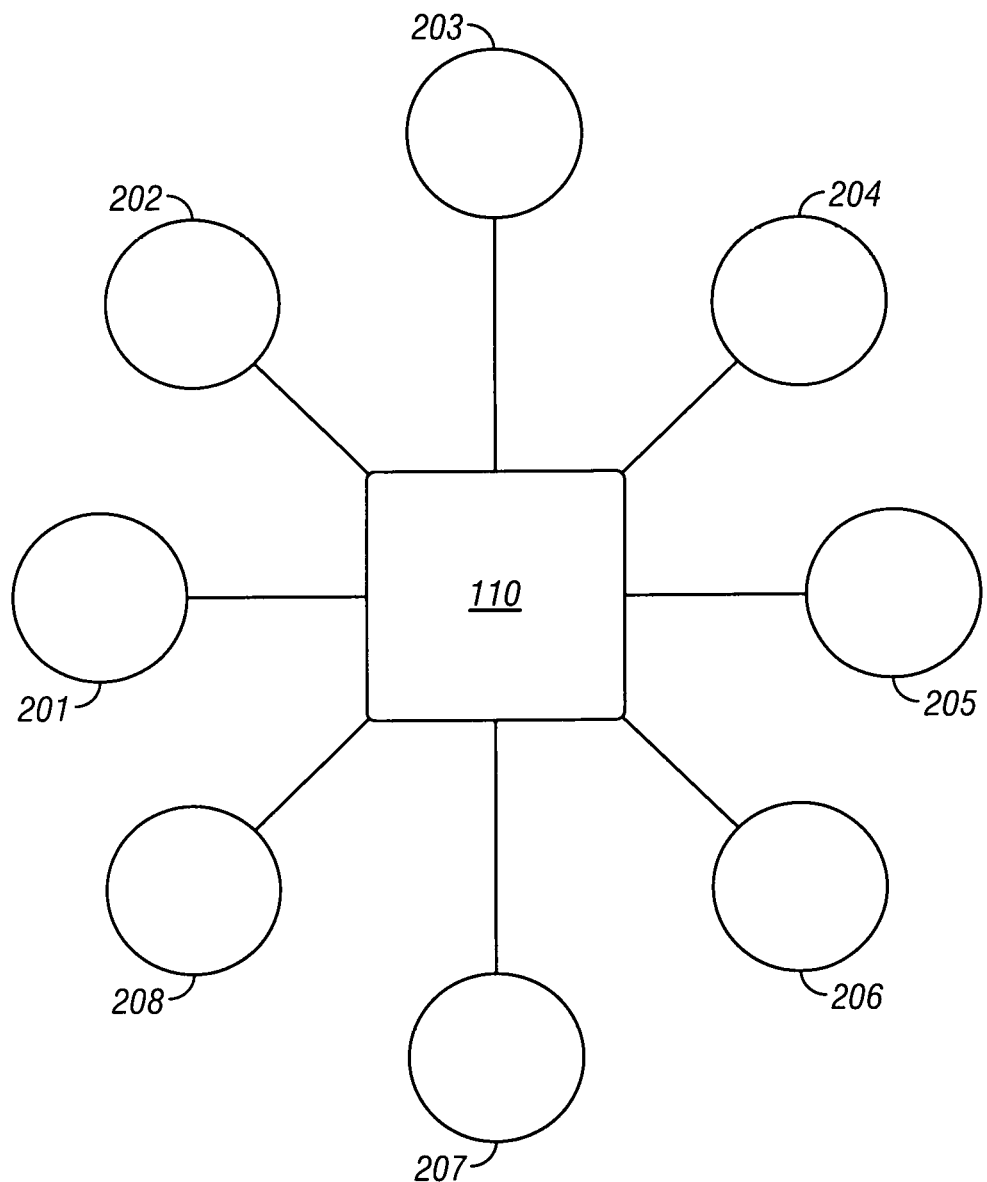
FIG. 2B illustrates a schematic representation of the risk management processing engine organized into a number of various processing modules according to some embodiments of the invention.

The risk management processing engine 110 described above includes various subsystems to carry out services including: administrative management, risk determination, cost calculation, data collection, and technical service deployment, among others. FIG. 2B illustrates a schematic representation of the risk management processing engine 110 organized into a number of various modules including: an administrative module 201, a policy holder account module 202, a risk determination module 203, an automated data collection module 204, a premium calculation module 205, a service deployment module 206, and auxiliary modules 207 and 208. It will be readily apparent to those with ordinary skill in the art having the benefit of this disclosure, that auxiliary modules 207 and 208 of the risk management processing engine can be developed later to add further functionality to the existing system.

Administrative Module

In some embodiments of the invention, an administrative module 201 provides administrative services in a technical services risk management system. In some embodiments the administrative module 201 provides an administrator of a technical services risk management system with computer-based access to the system via a graphical user interface.

In the presently preferred embodiment of the invention, the administrative module 201 offers the administrator of a technical services risk management system a graphical user interface for managing policy holder accounts, managing third-party technical service providers, processing policy claims, and deploying service calls, among other tasks.

In some embodiments of the invention, the administrative module 201 communicates with one or more of the other modules coupled with the risk management processing engine 110. For example, in some embodiments of the invention, an administrator sets a targeted profit margin that they desire for a given policy holder via the administrative module 201. In turn, the administrative module 201 communicates the targeted profit margin to the premium calculation module 205 to update the policy holder's premium and co-payment information (if applicable), as explained below. Other communication between modules for carrying out the invention will be apparent to those with ordinary skill in the art having the benefit of this disclosure.

Policy Holder Account Module

In some embodiments of the invention, a policy holder account module 202 provides policy holders with an interface to the technical services risk management system. In the presently preferred embodiments, the policy holder account module 202 offers the policy holder's graphical user interface to create an account, sign in to a created account, modify an account, request information from an administrator, submit information, monitor past and present tickets, and to submit policy claims, among other functionality.

Figure 3A:
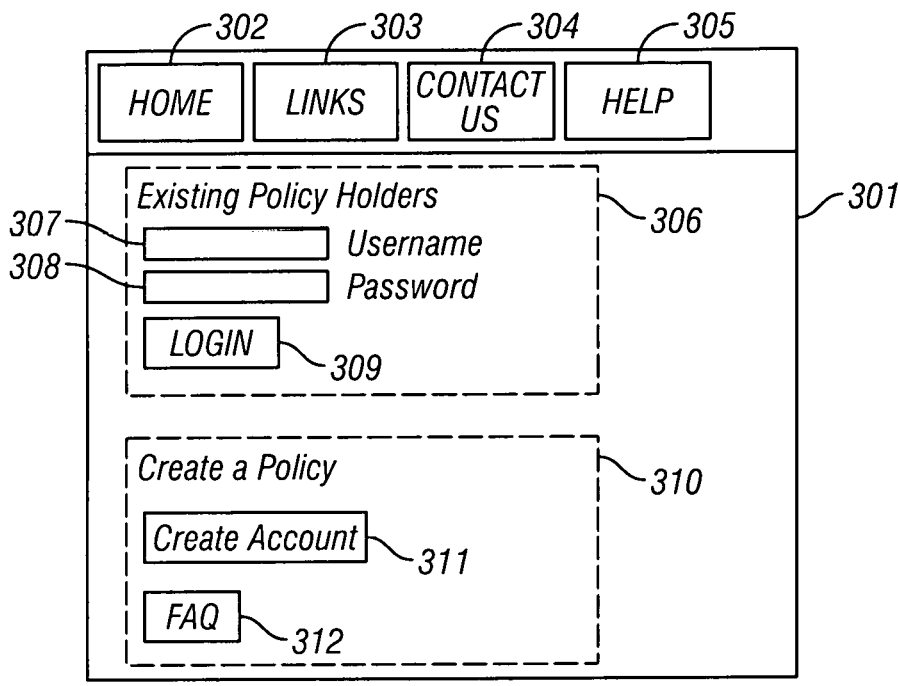
FIG. 3A illustrates an example of a graphical user interface for policy holders and potential policy holders according to some embodiments of the invention.

FIG. 3A illustrates an example of a graphical user interface 301 for policy holders and potential policy holders according to some embodiments of the invention. In some embodiments of the invention, the graphical user interface is delivered via an internet browser. The graphical user interface 301 includes controls 302, 303, 304, and 305 for navigating and interacting with the user interface 301. Additionally, the graphical user interface 301 includes a frame 306 including fields 307 and 308 and button 309 for existing policy holders to enter login information for logging into the technical services risk management system. Likewise, the graphical user interface 301 includes a frame 310 including buttons 311 and 312 for new policy holders to create an account with the technical services risk management system.

Figure 3B:
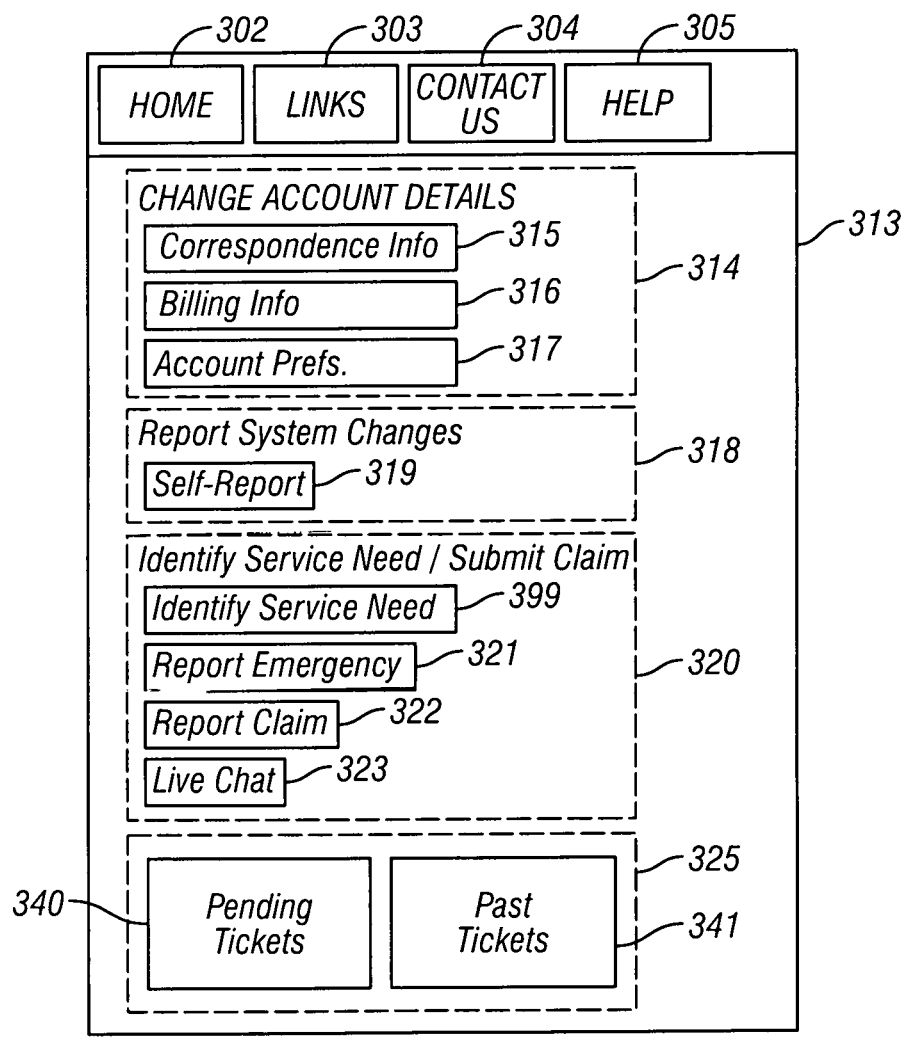
FIG. 3B illustrates an example of a graphical user interface for existing policy holders and according to some embodiments of the invention.

Existing policy holders access their policy account by logging into the technical services risk management system via button 309. After logging in, users are linked to another screen of the graphical user interface 301 for managing an existing account and reporting information to the technical services risk management system. FIG. 3B illustrates an example of a graphical user interface 313 for existing policy holders and according to some embodiments of the invention. The graphical user interface 313 also includes controls 302, 303, 304, and 305 for navigation.

The graphical user interface 313 includes frames 314, 318, and 320 for providing a policy holder with a plurality of tools. For example, frame 314 includes tools 315, 316, and 317 for modifying existing policy holder account details. Additionally, frame 318 includes a button 319 for self-reporting to the technical services risk management system. In some embodiments of the invention, self-reporting includes informing the system of changes to a policy holder's technical service needs, changes to a policy holder's technical system environment, changes to a policy holder's hardware or software systems, changes to personnel, etc.

In some embodiments of the invention, self-reporting includes the policy holder indicating that it has made a change to lessen the risk associated with servicing its technical needs. According to these embodiments, the policy holder account module 202 communicates this information to the risk determination module 203 and/or the premium calculation module 205 such that the risk reduction is reflected in the policy holder's premium.

The graphical user interface 313 also includes frame 320 for identifying service needs and facilitating claim submission by a policy holder. The frame 320 includes tools 399, 321, 322, and 323 for identifying a service need, reporting an emergency, reporting a claim, and initiating an interactive chat with an administrative employee. In some embodiments of the invention, the user account module 202 communicates with the service deployment module 206 to facilitate claim resolution (Explained below).

Finally, the graphical user interface 313 includes frame 325 including buttons 340, 341 for reviewing pending and past service events, aka tickets. In some embodiments of the invention, the buttons 340, 341 navigate the user to separate interface screens (not shown) to review pending and past tickets. In some other embodiments, a pop-up interface is automatically presented to the user each time a service event is resolved by the policy holder administrator, whether the resolution was requested by the policy holder or not. For example, the policy administrator may effectuate event resolution much more frequently than would otherwise be known to the policy holder. This is because some events are normally unnoticeable to the policy holder, i.e. when interrelated software systems require a hot fix upon the release of a new version of one of the systems. According to these embodiments, the pop-up interface reminds the policy holder that the policy administrator is working behind the scenes to ensure optimal system performance. Accordingly, the pop-up interface adds value to the risk management policy.

The technical services risk management system also facilitates creation of new accounts. In some embodiments, a representative of the administrator creates an account for a new policy holder and supplies the new policy holder with login information. Upon creation of a new policy, the administrator gathers information from a policy holder about their technical system environment.

In some embodiments, a representative may physically visit a potential policy holder to audit a technology system environment. The representative interviews the potential policy holder, interviews his employees, takes an inventory of various technical systems and software, and otherwise surveys his technical services needs. In some other embodiments, the representative takes information over the phone or via another communication medium.

Figure 3C:
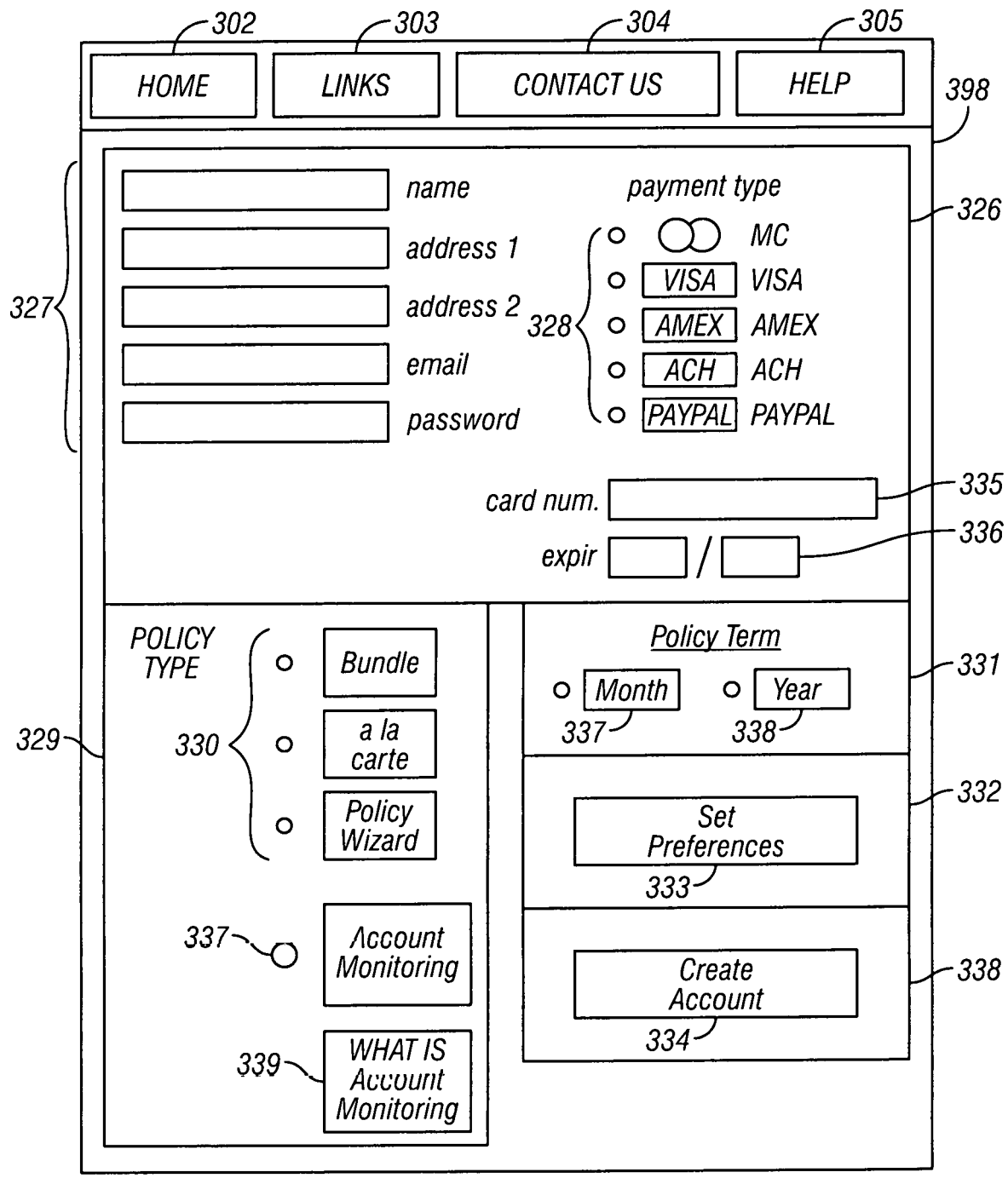
FIG. 3C illustrates an example of a graphical user interface for new policy holder account creation according to some embodiments of the invention.

In some other embodiments of the invention, a potential policy holder signs up for a policy using a graphical user interface. The potential policy holder reports their technical usage, service requirements, correspondence information, billing information, and their preferences via an account creation interface. FIG. 3C illustrates an example of a new policy holder account creation graphical user interface 398 according to some embodiments of the invention. The account creation interface 398 includes controls 302, 303, 304, and 305 for navigation and also includes frames 326, 329, 331, 332 and 338 which offer account creation tools.

Specifically, frame 326 provides a plurality of fillable fields for a new policy holder to enter identification information. Frame 326 also includes radio buttons 328 and fillable fields 335 and 336 for payment method entry.

Frame 329 includes radio buttons 330 for choosing a policy set-up type selected from among a bundled policy, an a la carte policy, and a policy established using a wizard application. Common policy terms and conditions are explained below. Likewise, a walkthrough of an exemplary policy wizard application is explained in relation with FIG. 3D below. Finally, appropriate bundles of policy coverage depend on the technology environment of the potential policy holder and will be readily apparent to those with ordinary skill in the relevant art having the benefit of this disclosure.

Frame 329 also includes a radio button 337 to indicate that a new policy holder desires to activate a remote monitoring feature (explained below). Likewise, a button 339 is offered which, when pressed, links a potential new policy holder to a pop-up window or a new screen to explain the account monitoring feature.

Frame 331 includes radio buttons 337 and 338 to set a policy term preference. Policy term is explained in greater detail below. Frame 332 includes a button 333 for linking a user to a preference page (not shown) for indicating various other account preferences including, but not limited to: billing options (pre-pay, one month recurring, three month recurring, etc.), monitoring options (if applicable), and security/permissions options.

Finally, frame 338 includes a button 334 for committing the entered information and creating an account.

Policy Terms and Conditions

The following is a list of some of the terms and conditions clauses which may be of utility for systems and methods of technology risk management services according to some embodiments of the invention. There are potentially unlimited numbers of terms and condition clauses that may be included in a technical service risk management policy. Therefore it will be obvious to those having ordinary skill in the in the art that other terms and conditions for technology service risk management systems are available for inclusion in the system described above.

Automatic Renewal Clause

A technology service risk management policy may include a clause indicating automatic renewal of the policy. Automatic renewal may occur in the absence of any action taken by a policy administrator, a policy holder, or both. This method encourages policy renewal.

Automatic Premium Payment Clause

A technology service risk management policy may include a clause specifying that the payment of a premium by a policy holder to a policy provider be automatic. The mechanism for autopayment may include credit card automatic recurring payments, automatic recurring bank transfers, or automatic debits of a checking account. This method encourages policy renewal, which may be of value to the policy provider, the policy holder, or both.

Minimum Standards Clause

A technology service risk management policy may include a clause indicating minimum standards required of the policy holder's environment in order for a policy to be offered or for a particular technology service to be covered. Such a clause may limit the liability of a risk management policy administrator. As an example, a constant temperature range for the physical operating environment of a technology hardware device may need to be maintained by a policy holder in order for service to be covered. As another example, a computer system may need to have a certain operating system installed on the computer system in order for service to be covered. As yet another example, a software system in use for a particular purpose may need to be manufactured by a particular manufacturer and have a certain version level maintained in order for service to be covered. As still another example, a physical device may need to have an active manufacturer warranty in place in order for service to be covered. In another example, a software system may be required to be of legal origin and be licensed in compliance with manufacturer guidelines.

Service Exclusion Clause

A technology service risk management policy may include a clause indicating an exclusion of service. This method may limit the liability of a risk management policy administrator. As an example, a technology service risk manager policy covering a telephone system in an organization may have a service-exclusion written into the policy such that the policy will not cover the telephone system if a problem requiring service is caused by another malfunctioning hardware device connected to the same physical network and the malfunctioning hardware interferes with the telephone. As yet another example, a cell phone technology service risk management policy may include a service-exclusion for setup, configuration, and training labor if the risk management policy administrator replaces a cell phone more than twice per year.

Service Maximum Clause

A technology service risk management policy may include a clause indicating a service maximum. This method may limit the liability of a risk management policy administrator and may mitigate moral hazard. Some risk may be shifted to a policy holder or to a service provider. As an example, a technology service risk management policy for escalator service may have a maximum coverage of service hours per escalator in any given month. As another example, an information technology service risk management policy may include a maximum number of technician physical on site service calls per policy term. As yet another example, a cell phone technology service risk management policy may limit a claim payment to $50 for the service of removing a virus from a cell phone operating system. As yet another example, a cell phone technology service risk management policy may limit claim payments to a total of $150 for the lifetime of the cell phone for services of removing a virus from a cell phone operating system.

New Technology Implementation Clause

A technology service risk management policy may include a clause for coverage of new technology implementation for certain technology systems that are replaced on a frequent basis. It is common in the technology service industry to treat one-time implementations of technology as non-recurring events. However, in many technology service scenarios, new technology implementations are actually predictable and follow a statistically normal pattern. Therefore, these situations may be analyzed on an actuarial basis, thereby making them situations that are able to be covered under the risk management policy.

As an example, a technology service risk management policy for a cell phone family plan may include coverage for the installation, configuration, and training involved in the acquisition of any new cell phone by a policy holder. As another example, an information technology service risk management policy may include coverage for any installation and configuration labor required to install a new file server when a policy holder decides to purchase a new one. As yet another example, an electric generator technology service risk management policy may cover the installation of a new electric generator system when a policy holder decides to replace an electric generator.

Technology Removal Coverage

A technology service risk management policy may include a clause for covering the removal of technology. Certain technologies may be complex and expensive to remove at the end of the technology's useful life. For example, extensive service labor may be incurred to remove a technology without incurring costly technology downtime. Additionally, extensive service labor may be incurred to remove a technology without damaging interrelated systems or causing employees or customers to be unable to use technology in a transition period. For at least these reasons, a technology removal clause may be of high value to a policy holder, who otherwise would have to pay costly service fees for technology removal. As with new technology implementation, removal of technology implementation may be predicted, may follow a statistically normal pattern, and may analyzed on an actuarial basis.

As an example, a technology service risk management policy for an automotive navigation system may include coverage for removal of the existing navigation system and the saving of the driver's custom data for subsequent transfer to a newly installed navigation system. As another example, an information technology service risk management policy may include coverage for service to remove a software system from all the computers located at a facility of a policy holder. This coverage may include service to resolve problems caused by removal of the software if the software was integrated with other software or hardware systems. As still another example, a cell phone technology service risk management policy may include disposal of a cell phone in an ecologically viable way or as a charitable contribution.

Technology Modification Clause

A technology service risk management policy may include a clause for coverage for modification of technology. Many technology products and systems frequently require adjustment or maintenance. The service cost required to modify technology implementations may be substantial. In many scenarios, the amount of service required for adjustment of technology implementations may be predicted and may follow a statistically normal pattern. For these reasons, these situations may be analyzed on an actuarial basis. This sort of coverage may have tremendous utility for a policy holder. As an example, a technology service risk management policy for cell phone coverage may include coverage for reprogramming of the cell phone so it is able to communicate and exchange email with the email server of a policy holder's new employer. As another example, an information technology service risk management policy may include coverage for service to modify the software loaded on the workstation of an employee of a policy holder.

As yet another example, a technology service risk management policy for an elevator system may include coverage for scheduled optimization and reprogramming of the elevator car start and stop logic between building floors.

Relocation Service Clause

A technology service risk management policy may include coverage for relocation services to compensate the policy holder for the expense of moving technology from one location to another. For example, the policy may cover technology moving expenses when a company moves operations from one office location to another. The service required to successfully move technology may be technically and logistically complex. Further, additional service labor may be required for some time during or after a move as other problems are discovered. This sort of coverage may have tremendous utility for a policy holder because the service cost for moving technology systems is often higher than expected.

As an example, an information technology service risk management policy may include coverage for services required to prepare the new office environment for an upcoming move. This may include ordering an appropriate computer telecommunications line for service at the new office location, making sure the line is physically installed during the required time window prior to the move, and designing and coordinating the construction of a server room prior to the move. As another example, a home theater technology service risk management policy may cover the service labor needed to physically move a bulky and technologically complex flat panel television system from the home of a policy holder to a newly purchased home. This coverage may also provide service for configuring the system and setting up television access system available at the new home.

Technology Training Clause

A technology service risk management policy may include coverage for training of humans regarding technology functionality. Emerging technologies may be complex to understand and learn how to use. Risk management coverage for training people how to use the technology is useful for a policy holder because there is risk that the cost of training will be expensive and unexpected.

As an example, a cell phone technology service risk management policy may include training services for how to send, receive, and manage text messages. As another example, a home theater technology service risk management policy may cover the service labor needed to train a policy holder on how to record and play back television shows using a digital video recorder. As yet another example, an information technology service risk management policy may include coverage for teaching the employees of a policy holder about how to use a word processor to produce footnotes efficiently for use in legal documents.

Standard Technology Conversion Clause

A technology service risk management policy may include a clause encouraging conversion of technology to a standard. Standard systems tend to be more reliable than custom systems or so called "one off" configurations because standard systems have fewer variables. Fewer variables may mean that less can go wrong. Therefore, a technology environment that makes use of standard systems may incur lower service cost and hence lower claims. Likewise, standard technology is easier and less costly for service personnel to service than non-standard technology because less training and experience is required to service standard systems.

For example, it is possible for a relatively inexpensive technology system to cost much more in annual service cost to maintain than the technology system cost to purchase in the first place. This set of circumstances creates an incentive for an administrator of a risk management policy to incentivize a policy holder to convert his technology environment to the standard systems. This creates an opportunity for an administrator of a risk management policy to limit liability while benefiting a policy holder who may experience more reliable technology, less downtime, and lower long term risk management premium expense and service expense.

As an example, a policy holder of a cell phone technology risk management policy may be given a new, free, and standard compliant cell phone if doing so will cut the risk of future service needs.

As another example, an information technology service risk management policy may include coverage to upgrade a corporate customer's desktop computer workstations to a particular operating system version in order to standardize the environment and avoid future service requirements. As still another example, a policy holder of a home theater technology risk management policy might be incentivized at policy renewal time to purchase a new digital video recorder with lower estimated service needs in exchange for not raising a premium.

Deductible Clause

A technology service risk management policy may include provision for a deductible. A deductable in the area of technology service risk management lowers the liability for the administrator of the risk management policy. At the same time, a deductable encourages a policy holder to request service only if it is necessary, thereby avoiding the inefficiency and high cost of moral hazard and unnecessary service. As an example, a home theater technology service risk management policy may include coverage for remote service without a deductable and for onsite service with a deductable, onsite service often being more costly for an administrator of the risk management policy to fund.

Copayment Clause

A technology service risk management policy may include provision for copayment. A copayment provision may lower an administrator's liability. At the same time, copayment encourages a policy holder to request service only if it is necessary which in turn avoids the inefficiency and high cost of moral hazard and unnecessary service.

As an example, a home theater technology service risk management policy may include coverage for remote service without a copayment and for onsite service with a copayment, wherein onsite service is generally more costly for a policy holder to fund. As another example, an information technology service risk management policy may include provision for a copayment for requested night and weekend service. As still another example, a technology risk management policy for elevator service may include a copayment for each time operator system console training is requested for a newly hired building operations person.

Coinsurance Clause

A technology service risk management policy may include provision for coinsurance. A coinsurance provision in a technology service risk management policy may lower an administrator's liability. At the same time, coinsurance encourages a policy holder to request service only if it is necessary which in turn avoids the inefficiency and high cost of moral hazard, unnecessary service, and unnecessary claims.

As an example, a home theater technology service risk management policy may include coverage for remote service without coinsurance and for onsite service with coinsurance, onsite service generally being more costly for an administrator to fund.

Elimination Period Clause

A technology service risk management policy may include provision for an elimination period to limit the administrator's liability.

As an example, an elimination period may encourage a technology user to learn how to resolve a situation themselves, avoiding not only a current service call but future service requests for the same sort of problem. It is well known art in the area of corporate information technology service to delay response to requests for service on purpose where the person who requested the service would be able to find the answer in a paper or electronic manual. This is to encourage the person to educate themselves and, thereby, avoid future service requests from the same person on the same subject.

As another example, an elimination period provision in a home computer technology service risk management policy would give a policy holder an opportunity to try and spend some time fixing a technology problem themselves before requesting covered service from a service provider. A percentage of the time, the policy holder may successfully solve the problem by themselves, resulting in avoidance of claim cost by an administrator of a risk management policy.

As yet another example, an elimination period for a cell phone technology service risk management policy may encourage a policy holder to configure a new cell phone themselves rather than request a service technician do it. And as still yet another example, a technology service risk management policy that covers training for newly purchased technology may have fewer and lower cost claims if it includes an elimination period after the installation of the new technology. A policy holder may be incentivized to try and learn the system on their own.

Subrogation Clause

A technology service risk management policy may include a method for subrogation. Technology products are often inherently complex and one product is commonly interdependent or connected to another in some way. This interdependency can sometimes make it unclear which manufacturer or service provider is responsible for service in a given situation. In some scenarios, technology system risk management service may be pre paid via a third party or may be otherwise covered under a separate warranty with a manufacturer or other third party. In some scenarios, overall service cost is lower if one technician services a product for all service that product requires, even if the technician is not as efficient in every single area of required service as other technicians might be. According to these embodiments, a subrogation clause is useful.

As an example, an information technology service risk management policy may cover labor for service to recover from a broken hard drive in a computer server located on the premises of a policy holder. While the replacement of the broken hard drive may be covered under a warranty with the original manufacturer, the warranty may cover only parts cost and the labor cost to physically replace the hard drive, but not to load and configure the software so a server can function again in the role it previously performed before the hard drive broke. Of course, a policy holder may want the server to be operational again as fast as possible. Therefore, it may be more efficient to have a service provider, who is not a manufacturer's representative of the server hardware manufacturer, and also begin the project of loading software and data onto the system. In this scenario, a subrogation clause will allow an administrator of a risk management policy to seek redress or reimbursement for hard drive replacement cost from the hardware manufacturer. This may also be beneficial to the hardware manufacturer, who may not have to send out their own technician or repair a system directly.

As another example, an administrator of a risk management policy for a cell phone service may have a method of subrogation included to allow a policy holder to receive cell phone service faster via a third party than waiting on hold for hours to speak with an overworked employee of the cell phone provider company during a peak period. The cell phone provider company will then reimburse some cost of this service to an administrator of a risk management policy in exchange for not having to staff their cell phone service center for peak periods.

Endorsement Inclusion Clause

In some embodiments of the invention, the risk management service for technology systems can include a provision for an endorsement, i.e. a means to augment the policy. New technology products are produced on a constant basis and the market is always coming up with new ways to use existing technology products. Trends such as this may lead to technology service needs that can change greatly in a relatively short period of time and lend themselves to the method of using an endorsement.

For example, prior to the invention of e-mail systems that could be used with cell phones, cell phone service needs for the average corporate user of a cell phone were minimal. However, after the proliferation of cell phone with e-mail capability, the service needs for the average corporate user of a cell phone became much greater. A provision in a technology system risk management policy including an endorsement may have utility in situations of this type.

Waiting Period Clause

A technology service risk management policy may include provision for a waiting period. In the area of technology service risk management, in an embodiment, a waiting period may be used to limit the liability of an administrator of a risk management policy while providing a relatively lower priced premium for a policy holder.

As an example, the accrual of funds by an administrator of a risk management policy during a waiting period may be used to mitigate future risk for service claim cost by using the funds for remediation or maintenance to avoid future claims. As another example, a waiting period may be used in an information technology service risk management policy to eliminate service claims for troubleshooting end user problems with a newly installed software product until after end users of a policy holder go through a training program and pass a certification test.

As yet another example, a corporate cell phone technology service risk management policy may not include coverage for cell phones of new employees of a policy holder until the employees have been on the payroll for a waiting period of two months, thus eliminating costly service claims involving employees who leave or who are terminated during this period. As yet still another example, a technology service risk management policy which has a component covering employee training on the proper use of a technology may not supply coverage until an employee is on the payroll of a policy holder for six months, thus eliminating possible wasted cost of training an employee whose increased labor efficiency from training may not benefit the policy holder to a meaningful extent.

A waiting period clause may be used to limit an administrator's liability while providing a relatively lower priced premium for a policy holder. In some embodiments, coverage for pre-existing conditions is limited or excluded for a period of time. As an example, a technology service risk management policy for information technology coverage which includes coverage for office move services may have a waiting period of twenty-four months if a pending office move is determined or indicated when determining a policy holder's profile.

Named Peril Clause

A technology service risk management policy may include a provision for a named peril. Naming a peril and providing coverage for the named peril can be beneficial for an administrator, a policy holder, or both. As an example, a cell phone technology service risk management policy may include named coverage for services and labor to reprogram a replacement cell phone following the loss of the original phone. As another example, an information technology service risk management policy may include named coverage for service to rebuild a server after it is functionally destroyed via a virus attack. As still another example, a technology service software risk management policy may include named coverage for labor to reprogram software deleted by human mistake.

Insurable Interest Clause

A technology service risk management policy may include a provision for insurable interest. An insurable interest provision in the area of technology service risk management may lower an administrator's liability and may mitigate moral hazard and other abuses. Without such a clause, an administrator may be exposed to increased liability. As an example, a cell phone technology service risk management policy may contain an insurable interest clause that excludes coverage for cosmetic programming of the digital screen interface. As another example, an information technology service risk management policy may have an insurable interest provision excluding use of social media sites that are frequent causes of viruses. As still another example, an elevator technology service risk management policy may include an insurable interest provision that excludes coverage for service requested from anyone other than a duly appointed representative of a policy holder who is vested with the authority to request service in the economic interest of the administrator of the risk management policy.

Territorial Rating Clause

A technology service risk management policy may include a provision for territorial rating. Territorial rating may limit an administrator's liability and increase profit. For example, the geographic location of technology affects the cost of technology service. For example, in some scenarios, technology service requires in-person, on-site visits to the location where technology physically exists or to the location where a user of technology physically resides. Also, travel time and transportation expenses for service personnel are expensive. It is also more expensive to service technology systems that are located in rural areas where the density of service providers is less than that in urban areas. As another example, a greater amount of technology service labor may be required to assist a geographically remote user without having person-to-person communication. Also, it may take longer to explain and troubleshoot a situation explained to a service technician via a telephone than it would to troubleshoot the same situation in person where the service technician would be able to see the problem with her own eyes.

Capitation Clause

A technology service risk management policy may include a provision for capitation. Capitation involves capping the amount of money paid out to service providers. In some embodiments, the administrator may limit liability for claims via capitation because this method encourages service provider efficiency by passing risk for service cost to a service provider. Capitation may provide benefit for a policy holder by incurring a lower premium than might otherwise be the case. A service provider may benefit by receiving a steady source of revenue. In the area of technology care risk management, capitation may involve a per covered human user per period fee paid to a service provider. It may also involve a per-covered device per period fee or a per covered software system per period fee.

As an example, an information technology service risk management policy may include a capitation clause that sets a claim payment limit by an administrator at $30 per month to monitor a computer workstation and keep the manufacturer supplied service patches up to date. As another example, an elevator system technology service risk management policy may include a capitation clause that sets a claim payment limit by an administrator at $1,000 per month per elevator shaft to supply lubrication services. As still another example, a home theater technology service risk management policy may include a capitation clause that sets a claim payment limit by an administrator at $10 per month per adult family member for home theater training services for the adult family members of a household.

Account Setup Options

As explained above, new policy holders are offered a variety of ways to set up a new account. In some embodiments of the invention, a potential policy holder is offered a complete list of services (aka a la carte). According to these embodiments, a potential policy holder individually chooses one or more coverage options. In some other embodiments of the invention, a potential new policy holder can chose one or more bundles of coverage, explained below. In some other embodiments of the invention, a wizard application gathers information from a potential policy holder and walks the potential policy holder through a logical list of services that may be relevant to that policy holder based on the answers to his questions.

Figure 4:
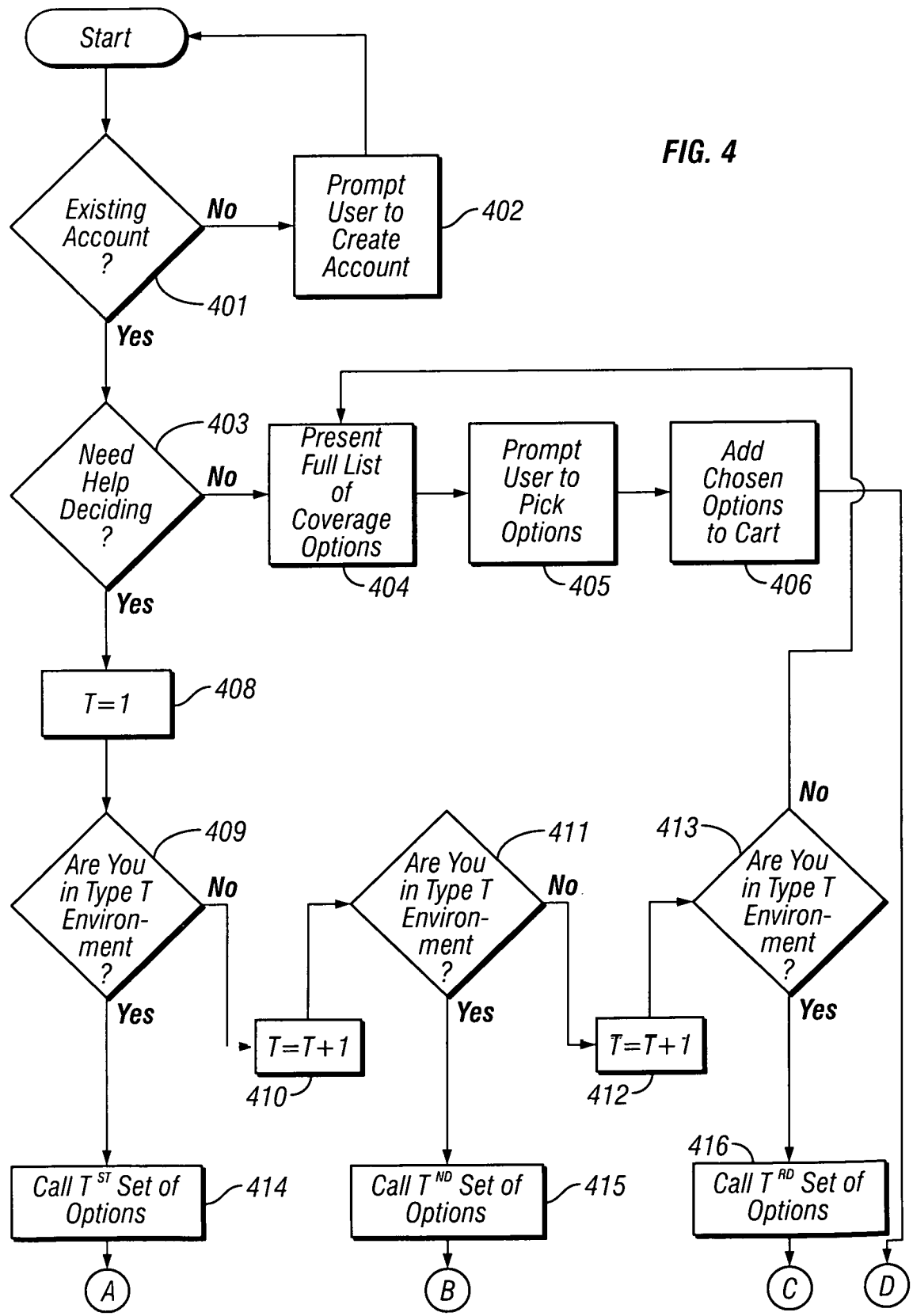
FIG. 4 is a flowchart diagramming the process steps of a policy setup wizard application according to some embodiments of the invention.
Figure 4:
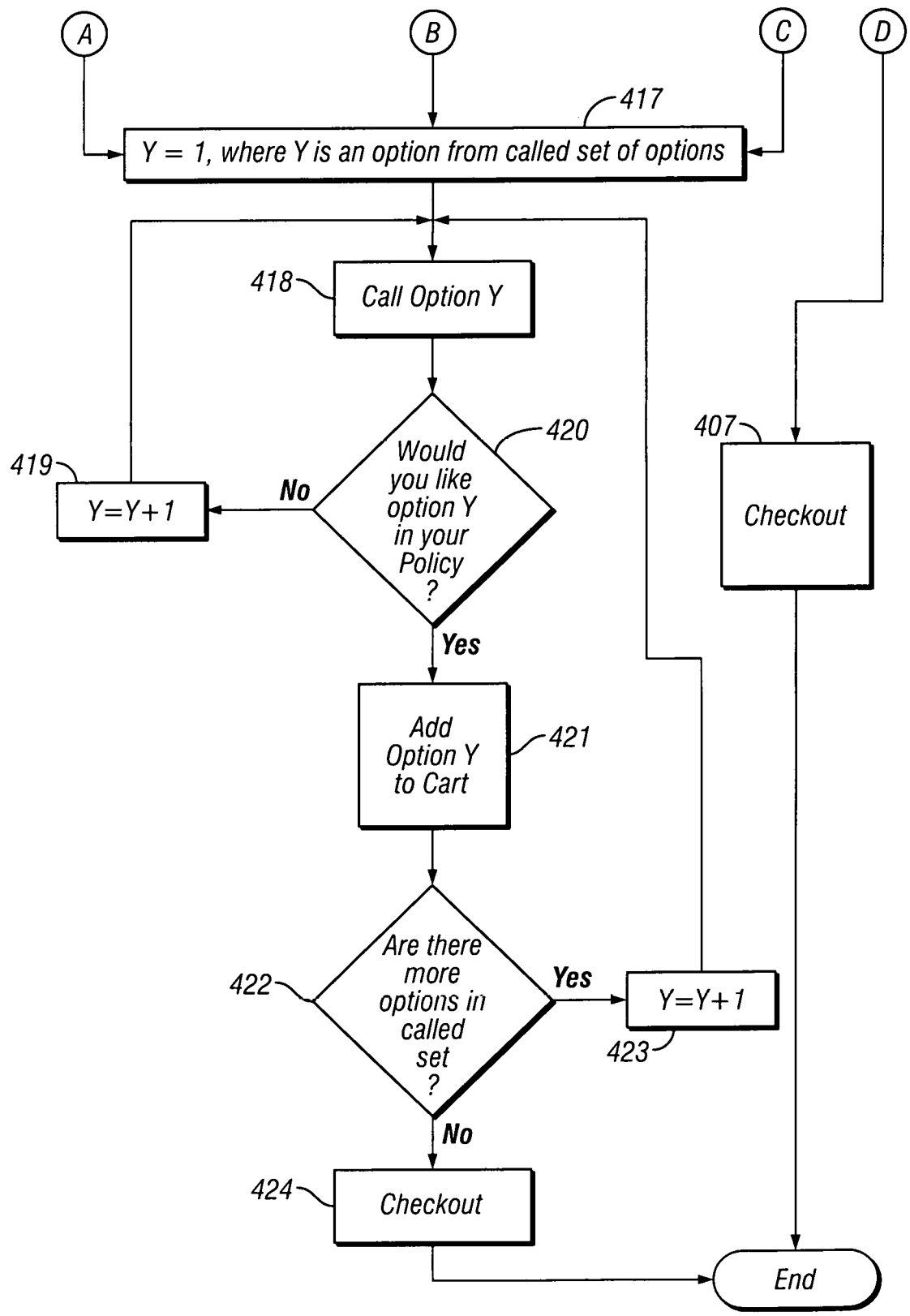

FIG. 4 illustrates a flowchart diagramming the process steps of a policy setup wizard application according to some embodiments of the invention. FIG. 4 includes the step of asking a user policy holder about whether he is involved with a particular business technology environment type. Only three types of businesses technology environment types are included in this example for the sole sake of brevity and clarity. However, it will be readily apparent to those with ordinary skill in the art that any number of technology environment types business types are possible. Some technology service environment types include specific business types, governmental technology systems, home office environments, and the like.

Likewise, the process shown is limited to querying a policy holder about technology environment types for the sole purpose of brevity. It will be readily apparent to those with ordinary skill in the art that any number of queries can be used to walk a potential policy holder through a policy setup including, but not limited to: what kind of software they run, what kind of hardware they run, the level of relevant technical education they and their staff have, the number of computers they run on a server, the bandwidth they require, what kind of virus protection software they run, and whether they use a firewall. In some other embodiments of the invention, the automated data collection module (explained below) gathers this information automatically.

The exemplary process diagrammed in FIG. 4 begins with a user prompt asking a user potential policy holder whether they have an existing account 401. If the potential policy holder does not have an existing account, the wizard prompts a user to create an account 402. After the potential policy holder creates a new account, the process resumes.

If the user policy holder has an existing account, the process continues with a prompt asking a user whether they need help deciding what kind of coverage they want to include in their policy 403.

If the user indicates that they do not require assistance, the user is presented with a full list of policy coverage options 404. The user is then prompted to pick coverage options 405. Finally, the user chooses one or more options 406 and proceeds to checkout 407 where the process ends.

If the user indicates that they want assistance choosing coverage at step 403, a counter is initialized 408 and the user is prompted to indicate whether they operate in a certain type of technical environment 409. If the user indicates that they operate in that technical environment, the wizard calls a set of coverage options correlating to the type of environment 414. If user indicates that they do not operate in that particular environment, the counter is increased 410 and the user is prompted to indicate whether they operate in a second type of technical environment 411. If the user indicates that they operate in the second type of environment, the wizard calls a set of coverage options correlating to that environment 415. If user indicates that they are not in that particular technical environment, the counter is increased again 412 and the user is prompted to indicate whether they operate in a third technical environment 413. If the user indicates that they operate in the third type of environment, the wizard calls a set of coverage options correlating to that environment 416. If user indicates that they are not in third environment, the user is presented with a full list of policy coverage options 404. The user is then prompted to pick coverage options 405. The user chooses one or more options 406, the user is prompted to check out 407, and the process ends.

Once a set of options are called, the process continues by initializing a second counter 417 and a first option from the called set of options is called 418. The user is then prompted to ask whether they would like the first coverage option included in their policy 420. If the user chooses not to include the first called option, the counter is increased 419 and a second option is called at step 418. On the other hand, if the user opts to include the first option, the first option is added to a cart 421. After the wizard adds an option to the cart, the wizard determines whether the called set of options includes more options 422. If so, the counter steps by one 423, and the sub-process of asking a user about whether to include options is reiterated. If there are no further options in the set, the user is prompted to checkout 424, and the process ends.

Policy Duration Considerations

The policy term of the risk management service for a technical system is set to a shorter duration, i.e. a one month term. However, it is not the intent of the present invention to limit a policy term to any particular length. There are some identifiable benefits for a short term duration.

A short policy term encourages policy sales. It is easier for a salesperson to sell a technology service risk management policy if a potential policy holder does not have to make what might be perceived as a long term financial commitment. A short policy term allows the potential policy holder to evaluate the value of the service as the service experience unfolds, without having to make a perceived long term commitment based on trust or feelings. Hence, the potential policy holder is more likely to sign up for a policy of perceived short duration, if only to try it out. The positive result upon overall sales for this type of method is often seen with product or service sales such as month-to-month auto rental or month-to-month office cleaning services.

Additionally, a short policy term encourages policy renewal. For the same reasons discussed above regarding the encouragement of policy sales, a short policy term for a technology service risk management policy encourages renewal if the upcoming policy period is likewise perceived by a policy holder to not be a long term financial commitment. The profitability of an administrator is often driven by policy renewal and therefore methods to encourage policy renewal may be of value.

A short policy term also encourages service quality. A short policy term incentivizes an administrator to provide value to a policy holder in a way that is recognized to be of value by the policy holder. This is because the policy holder may cancel the policy at renewal time if the perception of value is low. This helps avoid shoddy practices, lapses, and mistakes while at the same time encouraging quality control as well as positive communication to the policy holder of value received during the coverage period. The method stimulates competition by not providing an administrator with a monopoly position in relationship to a policy holder. It is well known in the field of economics that competition encourages quality of product offerings. A perception of quality in turn encourages high value benefits of renewal and word-of-mouth or viral sales for the administrator.

Additionally, a short policy term mitigates abuses in a technology service risk management policy by a policy holder. The policy holder is much less likely to abuse the terms and conditions of the risk management policy if the policy term is short because a premium may be calculated at the start of each new policy term. If the policy holder's behavior or claims lead to determination that abuse may be occurring, then the premium will rise or the administrator will take other action.

Also, a short policy term allows the calculation of a premium to occur fast. It is common in many technology environments that the level of technology service need can change quickly. Oftentimes these changes relate to increased risk. Consequently the cost of providing technology service often rise quickly. For example, the often rapid advances and changes in a technology environment create a dynamic environment. With a long policy term, an administrator may not be able to approximate the administrator's profit target on any sort of consistent basis. For example, if the calculated premium for the previous policy term includes a component per user of a technology, and an administrator adds more users during the previous policy term, the calculated premium for the new policy term will result in different pricing for the new policy term. As another example, if a risk management policy provides coverage for technology service in the area of information technology service for a corporate policy holder, the calculated premium can be partially determined by the number of each type of computer workstation and the number of each type of computer server in use by a policy holder. If this number of workstations or servers increases during a policy term, the calculated premium will increase at the start of the new term.

A short policy term also allows an inaccurately determined policy holder profile or inaccurately determined expected cost of technology service to not adversely affect the long term financial performance of an administrator. A calculated premium is only as accurate as the data input into the premium calculation system and the predictive nature of the statistical and actuarial analysis performed by the calculation system. Mistakes in data collection, calculation, and analysis happen. The administrators without a large number of policies may not be able to rely on the laws of large numbers to ensure profitability and they may not be able to afford complex actuarial analysis systems. For these reasons, a short policy term is more forgiving, thereby opening up the technology risk management marketplace to small businesses.

Also, the method of automated data acquisition (explained below) makes it more feasible for a policy administrator to offer a risk management policy with a relatively short policy term because automated collection of profile data may be inexpensive and may be done on a continual basis.

Policy Setup Fee

In some embodiments of the invention, a one-time setup fee is required as part of the policy term or terms. In some embodiments, this one time setup fee is greater than a typical premium. Preferably, the setup fee covers some or all startup costs for a policy administrator. The one-time setup fee gives a policy administrator a shorter period to reach breakeven profitability on a risk management policy while keeping premium relatively low. This method encourages policy sales and policy renewal, to the benefit of a policy administrator, the benefit of a policy holder, or both.

A setup fee may also encourage retention of a risk management policy since it gives a policy holder a financial stake in the success of the policy and renewals. For example, the policy holder may not want to lose the initial setup fee investment by cancelling a policy at renewal time until it is felt a certain amount of value is received. Generally speaking, if a policy renews for a few periods in a row, the likelihood is that it will continue to renew.

As still another advantage of this embodiment, a setup fee may encourage policy renewal because some policy holders will maintain the account until they feel as though they took advantage of the policy. Technology service risk management is a new business area. Policy holders are initially likely to be wary of the benefits and will be less likely to cancel the policy at renewal time because of their investment in the one-time setup fee. Hence, a one-time setup fee may give the policy holder sufficient time to evaluate the value of a risk management policy rather than rejecting it in an early policy period based on incomplete information.

Policy Bundles

In some embodiments of the invention, a technical service risk management policy may involve policy terms to provide a market basket of services of considerable value to a policy administrator, a policy holder, or both. It is not the intent of the present invention to limit the number or type of combinations of services that may be offered.

In some embodiments of the invention, two or more of the following services may be bundled to provide a high value offering to an organization which uses a technology:
training of human technology users;
technician on-site service visits;
technician remote service;
service via software systems, hardware/software systems, and robotic systems;
emergency service;
24 hour a day service;
7 day a week service;
365 days a year service;
new technology implementation;
removal of technology implementation;
modification of technology implementation;
regularly scheduled technician appointments;
technology maintenance;
proactive technology service;
technology remediation;
repair of broken technology;
technology calibration;
technology documentation;
technology reporting;
tip sheet creation;
technology advice;
technology consulting;
project management of technology projects;
technology project design;
technology procurement;
technology research;
technology procurement selection;
technology acquisition;
technology license management;
technology warranty management;
technology support contract management;
technology redeployment;
technology disposal;
technology relocation;
technology focused disaster planning;
technology disaster recovery;
technology data backup;
technology software backup;
technology staffing;
hardware provided as a service;
software provided as a service; and
combinations thereof.

In some embodiments of the invention, the following combination of services may be used to provide a high value offering to an organization which uses a technology: new technology implementation; removal of technology implementation; and modification of technology implementation. The policy holder may purchase a risk management policy which covers costs for implementing new systems, reconfiguring systems, and removing systems. This type of coverage is relatively narrow in scope and is not designed to cover all of policy holder's total technology service needs, but rather is designed just for coverage of projects or other perceived one time implementations of a defined scope. As an example, an information technology service risk management policy may include coverage for labor to install a new file server each time a policy holder decides to purchase one. Further, a risk management policy may include coverage for major upgrades to the server such as adding additional hard drives to the system or upgrading the server operating system software. And still further, a risk management policy may include coverage for replacing the server at the end of its life and migrating the server functionality, including software and data, to a replacement server. As another example, a software service risk management policy may include coverage for labor to install a particular software application and provide initial configuration. Further, a risk management policy may include coverage to make major modifications or upgrades to the software program as they become available. And still further, a risk management policy may include coverage to remove the software system if and when this is desired.

Combinations and Permutations of Terms and Conditions

In some embodiments, the terms and conditions of a technology service risk management policy may be combined together effectively in ways which result in utility to a policy administrator, a policy holder, or both. For example, a risk management policy for a personal digital assistant (PDA) may include provisions for a minimum standard required of a policy holder, a service exclusion, a service maximum, a deductible, and copayment. Furthermore, the policy may specify that a policy holder receives coverage only if the PDA is running a particular operating system. Further, the policy may specify that coverage is excluded if the contract with the wireless service provider for the PDA has lapsed. Still further, the policy may specify that coverage is limited to service for a maximum of two replacement PDAs per year. And still further, the policy may specify an annual deductable and a per incident copayment.

As another example, an information technology service risk management policy may specify that a policy holder receive coverage only if a computer server is running a particular operating system. Further, a risk management policy may specify that coverage is excluded if the operating system on the file server is an illegal or pirated copy of software or if the software is not licensed according to the software manufacturer's current licensing policy. Still further, a risk management policy may specify that coverage is limited to service for a maximum of $5,000 of service for the file server in any given month. And still further, a risk management policy may specify an annual deductable of $1,000 for the file server and a $150 per on-site visit copayment.

In yet another embodiment of the invention, terms and conditions of a technology service risk management policy may be combined together, wherein the term of a risk management policy is less than one year, wherein the policy includes a one-time setup fee, and wherein the setup fee is greater than the premium. As an example, an information technology service risk management policy may specify the policy term is one month and includes a one-time setup fee equal to three months of policy premiums, payable by a policy administrator to a policy holder.

As another example, an information technology service risk management policy may include coverage for a policy holder to cover service cost in excess of service supplied by a third party service provider under the terms of a service level agreement (SLA) between a policy holder and a service provider. This embodiment may be marketed as a technology service supplemental risk management policy or gap risk management policy. The policy holder may contract with a service provider via a service level agreement (SLA) for a set of services while another set of services, outside of the SLA and required by the policy holder, would be covered by the risk management policy.

It will be apparent to those skilled in the art having benefit of this disclosure that a variety of policy term bundles can be packaged to go well with the needs of individual policy holders.

Premium Calculation Module

As explained above, there are numerous factors that go into policy creation and premium calculation. In the preferred embodiments of the invention, a central processing engine gathers all the policy information and calculates the premium for individual policy holders. Referring again to FIGS. 2A and 2B, the risk management system 99 comprises a server-based risk management processing engine 110 including a premium calculation module 205 according to some embodiments of the invention. The premium calculation module 205 manages the relationships between the administrator and the users. For example, an administrator may want to charge a different premium for some policy holders independent of what the risk determination module 203 calculates (explained below), based on a pure business decision.

Risk Determination Module

The risk management system 99 comprises a server-based risk management processing engine 110 that includes a risk determination module 203 according to some embodiments of the invention. As explained below, policy holder data relating to the policy holder's level of risk associated with their technical service needs is obtained in a variety of ways. In the presently preferred embodiments of the invention, the risk determination module 203 ingests this data collected from the technical systems and technical systems environments of potential policy holders and policy holders and processes the data to produce a risk determination. In some embodiments of the invention, the policy holder data is dynamic in that the system continuously or occasionally updates the information. According to these embodiments, a step of risk determination occurs periodically to ensure the proper risk is assigned to each policy holder.

Once data is collected, it is analyzed using the risk determination module 203. In some embodiments of the invention, the risk determination module 203 includes a database of historical data relating to past occurrences of technological goods and services, associated rates of failure, and the costs associated with maintenance, service and replacement for those goods and services. Historical data may comprise industry historical data, policy holder environmental historical data, or both. According to these embodiments, the gathered data is compared with the historical data to determine the present risk of technology failure based on the historical data. A risk management policy can then be created based on the present risk and a calculated premium. Once the risk management policy is created, the technical system environment of the policy holder is monitored and analyzed.

In some embodiments of the invention, the gathered data for particular technical goods or services is transformed into an expected cost of resolving one or more potential failures or known service needs that occur in the environment.

In some embodiments of the invention, individual technical goods and services are assigned a base price per unit. According to these embodiments, one or more modifiers may also be assigned to the base price per unit depending on a subjective determination of risk. In some embodiments of the invention, the base price per unit comprises a single calculation for each product or service offering. In some other embodiments of the invention, units are grouped into bundles of single units that make sense to combine, called technology functional units.

In some embodiments of the invention, a base price is assigned to technology functional units. Technology functional units are groups of technological goods and services that might be expected to be used together in some way. Examples of technology function units include two or more physical pieces of hardware that work together or produce synergy, a combination of hardware and corresponding software, two or more interrelated software products, and combinations thereof. In some embodiments of the invention, the technology functional units are assigned a base price per unit. According to these embodiments, a lower base price is assigned to those technology functional units that are secure when used together and a high base price is assigned when the units are less secure when used together. For example, a policy holder's technology environment where a user or users utilize only three percent of the features of Microsoft Outlook is less of a risk than an environment where fifteen percent of the features are utilized. In this case, risk management coverage for the prior technology functional unit is given a lower base premium price. Likewise, a technology environment covered under a policy with two installed pieces of hardware that work synergistically may enjoy a higher base price for coverage compared with the two separately.

Whether a base price per individual unit or a price per technology function unit is used, the price per unit is used to calculate a policy expense. The simplest algorithm involves multiplying the base price per unit per month or per policy period and the number of units used.

For example, a policy holder may want to buy a risk management policy for their employees' company personal digital assistant devices. The risk management administrator may negotiate a base fee of $29.00 per unit per month for synching the device with Microsoft Outlook and Microsoft Exchange. Assuming the company purchases the policy for ten devices, the policy would cost $290 a month. However, this policy does not cover any other uses of the device, i.e. using the personal digital assistant as a tandem modem.

In another example, a risk management policy is set up for a technology functional unit, specifically an entire computer workstation. According to this example, the risk management administrator may negotiate a fee of $119 per month per workstation for a business with less than fifty employees. According to this example we see that the size of the business is a factor. Another factor includes the field of industry and the type of business. For example, a warehousing business is likely less expensive to service than a financial firm because, despite the financial people being more computer savvy, the warehousing service only uses computers for simple inventory while the financial firm conducts sophisticated transactions requiring integrated software systems, firewalls, remote access, etc.

Likewise, the relative degree of profit per computer is a factor in pricing. For example, a higher cost per base unit may be justified in an industry where computer downtown will result in high lost profits.

In some embodiments, the risk management module 203 also considers the age and shelf life of hardware and software products. For example, utilizing a late model operating system with old computer hardware typically costs more in support than utilizing the same operating system with a contemporary hardware package because the older, slower hardware utilized in combination with a newer, hardware-hungry operating system will normally require relatively high levels of service while service may consume more labor hours as the machine is slower to respond when worked on. Likewise, exclusions can be used to exclude coverage for certain things, i.e. computers running an outdated operating system. Finally, the policy provider can decide when it is simply never profitable to extend risk management coverage.

In some embodiments, the risk management module 203 also considers standardization when determining price per unit or price per technology functional unit. This is because standardization between units means fewer variables. Fewer variables typically translates to less that can go wrong, which means a lower risk due to anticipated and lower support needs. For example, a company with Apple Macs and PCs will have a higher support need than a company that uses any single one hardware platform.

In some embodiments, the risk management module 203 also considers the physical location of the computer systems. For example, computers located at a headquarters are less expensive to service than computers located remotely, i.e. a call center located in India.

The preceding factors are all accounted for using base unit modifiers. The modifiers raise or lower the base price per unit by a percentage or by a, dollar amount. In some embodiments of the invention, the modifiers are industry specific. For example, the price for risk management coverage for a company's personal digital assistants (PDAs) can depend on the type of business that company engages in. According to this example, a base coverage price might be five dollars per month to cover a relatively simple PDA and twenty nine dollars per month to cover the most sophisticated PDA devices. The base price may be modified for any number of reasons.

For example, the company offering the risk management coverage may decide to mark up the premium when more than one PDA hardware platform is in use. In another example, a discount might be given for a policy where the users of the PDA devices only work during normal business hours such that a repairman would more likely be available, i.e. an employee of a union. In another example, an increase premium modifier might be applied to an organization that deals with extra sensitive information (i.e. a financial firm) in order to account for extra network security maintenance. In yet another example, an even higher premium might be applied to a venture capital firm where high levels of servicing needs combined with low delay time tolerance, after hours servicing needs, and international travel drive up costs of servicing a risk management policy.

In some other embodiments, an additional premium is added to a risk management policy for coverage of users who are physically located outside a given radius from their company headquarters (i.e. telecommuters), wherein it is more expensive to service geographically distant clients.

In some other embodiments, an additional premium is added to the base price of a technical services risk management policy if a large portion of a workforce all uses interconnected devices. In the PDA example, it is assumed that if a large percentage of a workforce use SMS services on their PDA devices, the higher SMS traffic will result in a higher service need for the policy holder.

In some embodiments of the invention, the experiences of the people using the hardware or software covered under the risk management coverage policy are used in modifying the base price. For example, the age of the user can modify the price based on assumptions or empirical data relating to how that age demographic handles the technology.

Additionally, the policy's individual users' exposure and their expertise with the technology can be used to modify base price. In some embodiments, expertise will lower the cost based on the assumption that the user can troubleshoot problems better and may even be able to fix the problem himself. In other embodiments, a user's expertise will raise the premium based on the assumption that a so-called expert will be more likely to tinker with the technology or utilize a relatively higher percentage of technology features, thus presenting a greater opportunity for failure, problems, or other service needs. In some embodiments, the base price is modified given the likelihood that a human user of a technology will need extra explanation, training, or troubleshooting.

In some embodiments, the base prices and the modifiers are obtained via historical statistical analysis of claims across a policy provider's risk pool. Using the statistics, correlative variables are determined. For example, an analysis may determine whether claims are high at one firm because ninety percent of the employees never graduated high school, because the firm runs around the clock, or because of some other variable that correlates. It is up to the actuarial risk analyzers of the policy administrator to determine the correlative variables and adjust base pricing and modifiers as appropriate. In the presently preferred embodiment of the invention, base prices and modifiers may change based on a particular policy holder's history of claims, i.e. a consistently money-losing policy may have the price increased at policy renewal time.

The risk determination module 203 obtains the data needed to make risk determinations from sources including the user account module 202, the automated data collection module 204 (explained below), and the external database 107.

Automated Data Collection

As explained above, the risk management processing engine 110 includes an automated data collection module 204 for automatically obtaining data that relates to technology risk from policy holders. Automated data collection ensures that the policy holder is reporting accurate information. Additionally, automated data collection can alert the risk management provider whether a potentially bigger problem is likely to occur. The automated data collection is performed either periodically or continuously.

According to the presently preferred embodiments of the invention, automated data collection performed by the automated collection module 204 allows adaptive recalculation of risk and automatic changes to the terms and conditions of the policies. For example, adaptive recalculation can be immediately reflected in the premium required to maintain or renew the policy. In some embodiments of the invention, a policy holder is automatically notified upon such a change.

For example, suppose a business has a risk management policy covering the servicing costs associated with ten employees running Microsoft Outlook. The automated data collection module 204 may discover that an eleventh computer is installed in the network and the new computer is running a third party email and calendaring software, thereby creating a potential problem of interoperability between the machines. According to this example, the policy holder may be automatically notified via a pop-up message in the graphical user interface that the potential problem exists and that an increase to the policy premium will be reflected in their next invoice to account for the new risk.

In some embodiments of the invention, automated data collection is accomplished by the risk management processing engine 110 connecting to a client's computer connected remotely to the policy holder's technical environment. The risk management processing engine 110 queries a policy holder's internal network resources and otherwise measure a policy holder's internal systems. In some embodiments, the risk management processing engine 110 can be set to require policy holder authorization per use. For example, authorization can be given via the graphical user interface displayed by the policy holder account module 202 during the application process. In some embodiments, the risk management processing engine can be set to handle ongoing monitoring. For example, a packet may be sent to see how many computers are present on the policy holder's internal network.

In some other embodiments of the invention, automated data collection is accomplished by the automated data collection module 204 using remote monitoring bots that are internal to a client's network. According to these embodiments, the bots are installed within the policy holder's technical environment. The bots then report during either the application process, when the risk management policy is in place, or at other appropriate times. In some other embodiments, the bots are installed and perform continuous or semi-continuous monitoring of any changes to the system, usage of the system, any patterns, etc.

In some other embodiments, automated data collection is accomplished by the automated data collection module 204 monitoring policy claims and data mining the claims for useful information. For example, the automated data collection module 204 can analyze the financial implications of the data collected to determine trends or patterns. Likewise, the automated data collection module 204 may conduct statistical analysis of policy claims to identify new variables, observe patterns over time, and alert the administrators if there is an abnormality or other situation which may require attention.

In some other embodiments, a user self-reports changes to their technical hardware or software systems, as explained above. As shown in FIG. 3B, the user interface 313 includes a button 319 for self-reporting to the technical services risk management system. The user is encouraged to self-report to indicate that he has made a change to lessen the risk associated with servicing his technical needs in order to reduce the policy premium or cover a new technology environment.

Service Deployment Module

As explained above, the risk management processing engine 110 includes a service deployment module 206. The service deployment module 206 performs a method of ingesting a policy claim, analyzing the claim, and deploying a fix. As explained above, there are two primary types of service deployment.

The first type of service deployment, referred to as administrative resolution, involves identifying a service need, the policy holder reporting the service need to a policy administrator, and the policy administrator resolving the technical service event, either remotely using bots or locally by using a technician.

The second type, referred to as policy holder resolution, involves identifying a service need, the policy holder scheduling resolution of the event themselves, the policy holder submitting a claim to the policy administrator, and the administrator reconciling the claim.

Figure 5A:
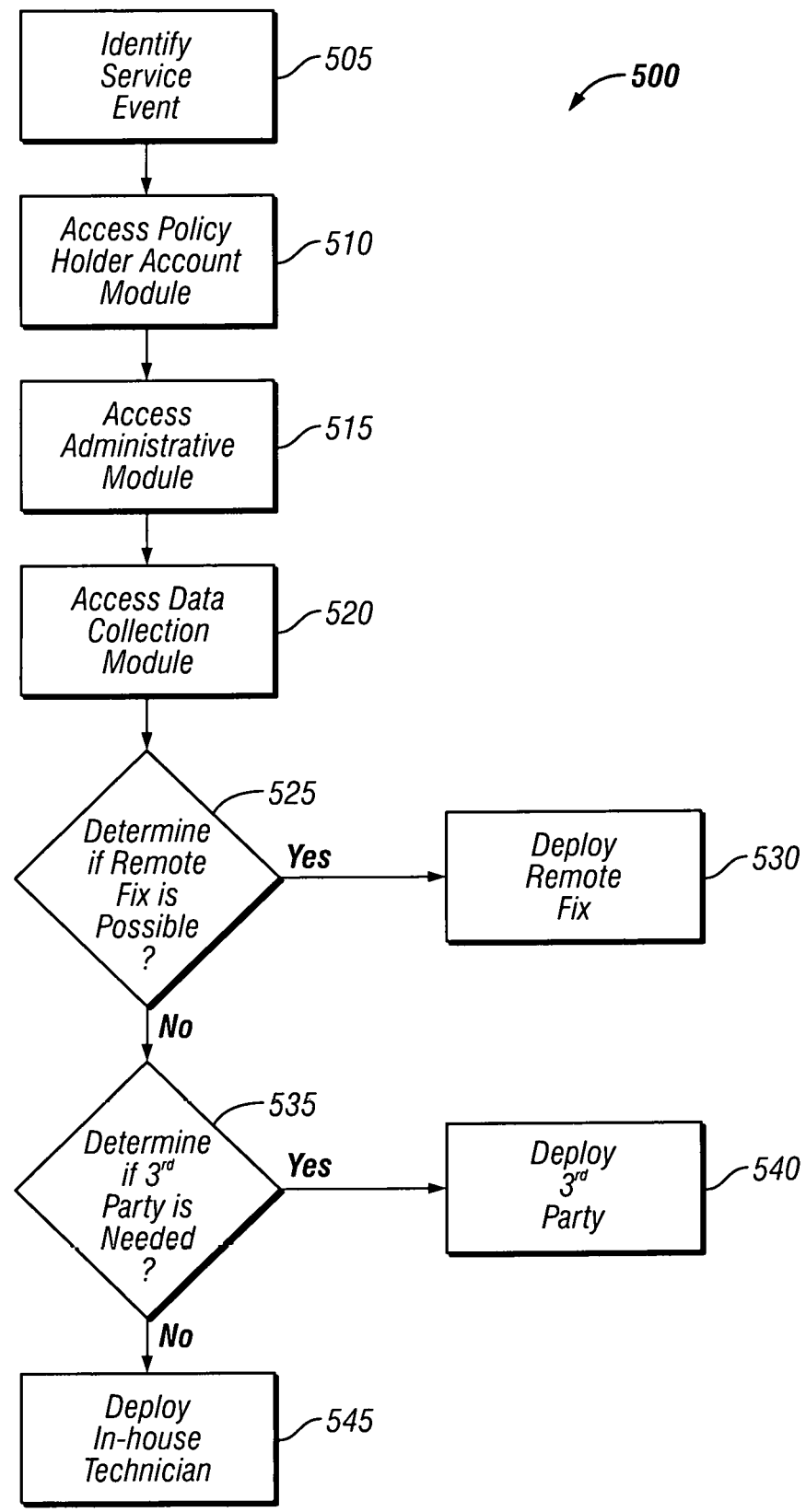
FIG. 5A illustrates an exemplary method of administrative event resolution performed by the service deployment module according to some embodiments of the invention.

FIG. 5A illustrates an exemplary administrative resolution method 500 performed by the service deployment module 206 according to some embodiments of the invention. The method 500 is initiated when the risk management processing engine 110 recognizes an identified service event 505. The event can be identified by the policy holder itself or by the bots used in the automated data collection module as explained above.

In some embodiments of the invention the risk management processing engine 110 accesses 510 the policy holder account module 202 to determine whether a particular type of service event is covered under that particular policy. If the policy covers the service event, the method 500 proceeds. If the policy does not cover the particular type of service event, the user may be prompted to purchase more inclusive coverage package or may be prompted to purchase an a la carte technical support option.

In some embodiments of the invention, after comparing the policy holder's account with the submitted service event, the method 500 accesses the administrative module 201 to determine if the policy holder is current on their bill. If the policy holder is not current on their bill, the method may prompt the policy holder to pay their bill before the repair or fix is deployed. On the other hand, if the policy holder is current on their bills, the method 500 proceeds.

In some embodiments of the invention, the method 500 accesses the automatic data collection module 204. According to some embodiments of the invention the automatic data collection module 204 queries the policy holder's technical system environment to determine if there is a more efficient way to diagnose or otherwise fix the service event.

Next, the method 500 determines whether it is possible to address the service event remotely. For example, if the method 500 queries the policy holder's technical system environment and determines that the service event is merely the result of outdated software that can be remedied by a patch, the method 500 deploys a remote fix 530. On the other hand, if the method 500 determines that a remote fix is not possible, the method 500 proceeds.

Next, the method 500 determines whether it is necessary to use a third party service provider to resolve the service event 535. If so, a third party is deployed to resolve the service event 540. In some embodiments of the invention, if a third party is needed to resolve an event, the risk management processing engine 110 automatically contacts a third party 106a via the network 103. On the other hand, if the service event can be dealt with by an in-house technician, the method deploys an in-house technician 545 to resolve the service event.

Figure 5B:
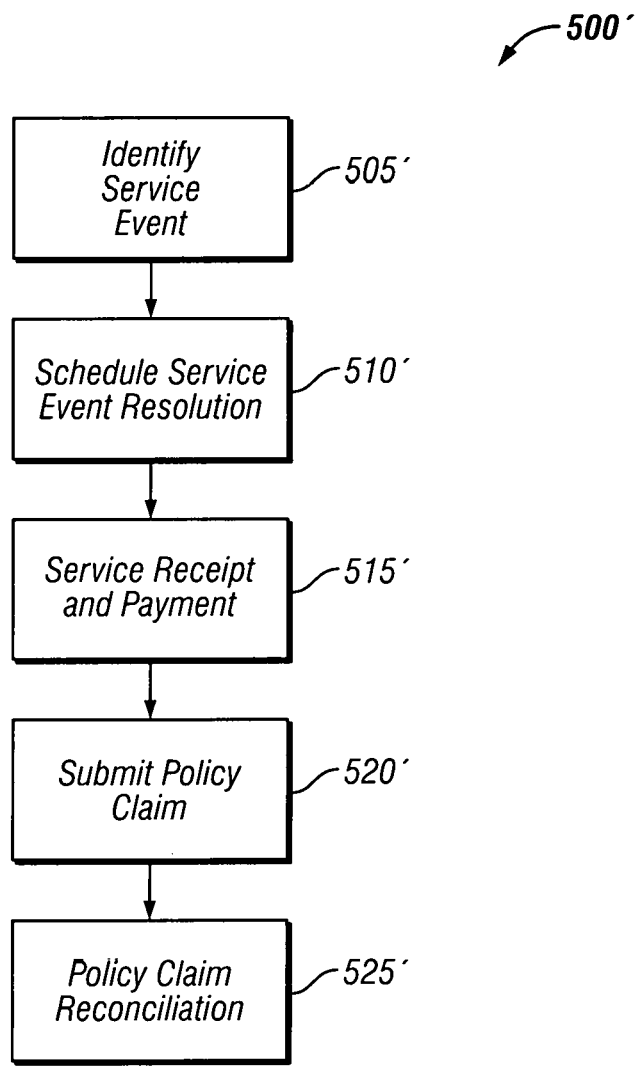
FIG. 5B illustrates an exemplary method of policy holder event resolution and claim reconciliation performed by the service deployment module according to some embodiments of the invention.

FIG. 5B illustrates an exemplary policy holder resolution method 500' performed by the service deployment module 206 according to some embodiments of the invention. The method 500' begins with a policy holder identifying a serviceable event 505'. Next, the policy holder schedules service event resolution 510'. The policy holder receives service and pays the service provider 515'. Next, the policy holder submits a policy claim to the risk management policy administrator 520'.

In some embodiments of the invention a policy holder submits a policy claim via the user account module 202. In some other embodiments, a policy claim is sent by a user via a text message, an instant messaging service, or a browser-based message. In some other embodiments a user phones a policy claim, faxes a policy claim, or sends the policy claim via postal mail or courier.

Finally, the method 500' concludes when the risk management policy administrator reconciles 525' the policy claim by reimbursing the policy holder.

The invention claimed is:

1. A method implemented over a network between a processor and a technical system that includes any of an electronic device, wherein the processor includes instructions for implementing the method, the method comprising:
   inputting information regarding the technical system;
   based on the input information, establishing a contract to pay for an expense incurred during a particular time window, wherein the expense is related to operation of at least a portion of the technical system during the particular time window;
   utilizing a bot for monitoring the electronic device, wherein the utilized bot includes instructions for remotely monitoring the operation of its corresponding electronic device;
   receiving over the network data from the utilized bot regarding the remote monitoring of the operation of the electronic device of the technical system;
   identifying from the received data a certain technical event affecting the operation of the electronic device during the particular time window; and
   taking an action to resolve the identified technical event affecting the operation of the electronic device.

2. The method of claim 1, wherein the electronic device includes any of a mobile phone, a computer system, or other electronic device that includes an application.

3. The method of claim 1, wherein the established contract specifies at least one of: a deductible amount, a copayment amount, or a capitation amount for the particular time window.

4. The method of claim 1, wherein the utilizing the bot for monitoring the electronic device includes implementing over the network an installation of the bot for monitoring the electronic device, wherein the installed bot the includes the instructions for remotely monitoring the operation of its corresponding electronic device.

5. The method of claim 1, wherein the processor includes instructions for:
   determining that the contract specifies a deductible amount for the particular time window; and
   responsive to determining that the contract specifies a particular deductible amount, reducing a payment amount by a portion of the deductible amount.

6. The method of claim 1, wherein the resolving of certain events includes any of installing, modifying, repairing, replacing or removing any of the electronic device.

7. The method of claim 6, wherein the certain events further comprise relocating the technical system to a different location.

8. The method of claim 1, wherein the particular time window is no longer than one month.

9. The method of claim 1, wherein at an expiration of the particular time window, a premium amount changes based on risk information.

10. The method of claim 1, wherein the monitoring of the operation of the electronic device by the utilized bot is performed on any of a continuous or semi-continuous basis.

11. The method of claim 1, further comprising:
    responsive to the remote monitoring of the certain events within the particular time window, automatically adjusting a premium for the issued contract based on the remote monitoring of technical service usage of the technical system.

12. The method of claim 1, wherein the resolving the identified technical event is performed remotely from the particular device using a remote bot.

13. The method of claim 1, wherein the resolving the identified technical event is performed remotely from the particular device using a service technician.

14. The method of claim 1, wherein the resolving the identified technical event is performed locally at the particular device using a service technician.

15. The method of claim 1, wherein the resolving the identified technical event is performed locally at the electronic device using a locally-installed bot.

16. The method of claim 1, further comprising by the processor:
    receiving a particular claim against the contract to pay expenses related to resolving the identified technical event affecting the electronic device of the technical system; and
    determining a payment amount based at least on a cost of the resolving of the identified technical event affecting the electronic device of the technical system, and at least one of:
    a deductible amount;
    a copayment amount; or
    a capitation amount specified by the contract; and
    paying the payment amount to a contract holder of the established contract.

17. The method of claim 16, wherein determining the payment amount further comprises determining a portion of the deductible amount not already paid towards the deductible amount during the particular time window.

18. The method of claim 16, wherein determining the payment amount in response to the particular claim further comprises:
   determining that the established contract specifies a particular deductible amount;
   determining that the identified technical event can be resolved remotely without dispatching a technician to a location associated with the affected electronic device; and
   determining a payment amount equal to a full cost of resolving the identified technical event without subtracting any portion of the deductible amount from the payment amount.

19. The method of claim 18, wherein resolving the identified technical event comprises establishing a connection over the network to the affected electronic device or software or to a device used by a user associated with the affected electronic device.

20. The method of claim 18, wherein resolving the identified technical event comprises establishing a telephone connection between a technician and an individual associated with the affected electronic device.

21. The method of claim 1, wherein the established contract is issued to a person considered as a contract holder associated with the technical system.

22. The method of claim 1, wherein the established contract includes a provision for coinsurance for the technical system.

23. The method of claim 1, further comprising:
   determining a premium for the issued contract.

24. The method of claim 1, wherein the established contract includes a provision for territorial rating, which is based on a physical location in which the electronic device is located.

25. The method of claim 1, wherein coverage for a pre-existing condition of the electronic device is limited or excluded by the issued contact for a period of time.

26. The method of claim 1, wherein the issued contract includes coverage for a service event that is not monitored by the bot.

27. The method of claim 1, wherein the issued contract includes coverage for installation a patch for the electronic device, wherein the patch corresponds any of an update, a bug fix, or security.

28. The method of claim 27, wherein the patch includes any of an opt in or an opt out for a user of the electronic device.

29. The method of claim 1, wherein the technical system is associated with one or more technical goods or services.

30. A non-transitory computer-readable medium storing a computer program comprising a program code for performing, over a network between a processor and a technical system that includes an electronic device, the steps comprising:
   inputting information regarding the technical system;
   based on the input information, establishing a contract to pay for an expense incurred during a particular time window, wherein the expense is related to operation of at least a portion of the technical system during the particular time window;
   utilizing a bot for monitoring the electronic device, wherein the utilized bot includes instructions for remotely monitoring the operation of its corresponding electronic device;
   receiving over the network data from the utilized bot regarding the remote monitoring of the operation of the electronic device of the technical system;
   identifying from the received data a certain technical event affecting the operation of the electronic device during the particular time window; and
   taking an action to resolve the identified technical event affecting the operation of the electronic device.

31. A system implemented over a network with a technical system that includes any of an electronic device, the system comprising:
   a computer including a processor; and
   a network interface between the processor and the network;
   the processor implements a process including:
      inputting information regarding the technical system;
      based on the input information, establishing a contract to pay for an expense incurred during a particular time window, wherein the expense is related to operation of at least a portion of the technical system during the particular time window;
      utilizing a bot for monitoring the electronic device, wherein the utilized bot includes instructions for remotely monitoring the operation of its corresponding electronic device;
      receiving over the network data from the utilized bot regarding the remote monitoring of the operation of the electronic device of the technical system;
      identifying from the received data a certain technical event affecting the operation of the electronic device during the particular time window; and
      taking an action to resolve the identified technical event affecting the operation of the electronic device.

32. The system of claim 31, wherein the processor performs steps including:
   establishing a policy holder account, including:
      creating the policy holder account,
      modifying the policy holder account,
      accepting payment for the policy holder account to remain active, and
      receiving a request for service that includes a request to resolve a technical service need covered under the policy holder account;
   managing the policy holder account;
   gathering policy holder data and calculating a cost associated with servicing an individual policy holder's technology needs;
   monitoring the technical system environment of the policy holder and automatically delivering updated information wherein the cost is updated based on the updated information;
   accepting the reporting of the technical service need;
   determining if the technical service need is covered by the policy of the individual policy holder;
   determining if the individual policy holder account remains active; and
   taking an action to resolve resolving the technical service need.

* * * * *